(12) United States Patent
Makita et al.

(10) Patent No.: US 12,248,165 B2
(45) Date of Patent: Mar. 11, 2025

(54) ILLUMINATION DEVICE AND IMAGE SCANNER

(71) Applicant: Mitsubishi Electric Corporation, Tokyo (JP)

(72) Inventors: Taisuke Makita, Tokyo (JP); Hiroyuki Kawano, Tokyo (JP); Shigeru Takushima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/912,857

(22) PCT Filed: Apr. 3, 2020

(86) PCT No.: PCT/JP2020/015302
§ 371 (c)(1),
(2) Date: Sep. 20, 2022

(87) PCT Pub. No.: WO2021/199422
PCT Pub. Date: Oct. 7, 2021

(65) Prior Publication Data
US 2023/0144125 A1    May 11, 2023

(51) Int. Cl.
*F21V 8/00* (2006.01)
*H04N 1/028* (2006.01)
*H04N 1/04* (2006.01)

(52) U.S. Cl.
CPC ....... *G02B 6/0055* (2013.01); *H04N 1/02835* (2013.01); *H04N 1/04* (2013.01)

(58) Field of Classification Search
CPC .... G02B 6/0018; G02B 6/002; G02B 6/0068; G02B 6/0055; F21V 8/00; H04N 1/028; H04N 1/04
See application file for complete search history.

(56) References Cited

U.S. PATENT DOCUMENTS 5,839,812 A * 11/1998 Ge ................. G02B 6/005
362/330
6,172,356 B1 * 1/2001 Ogura .............. H04N 1/0318
385/47
(Continued)

FOREIGN PATENT DOCUMENTS

JP    8-101654 A    4/1996
JP    10-93765 A    4/1998
(Continued)

OTHER PUBLICATIONS

International Search Report and Written Opinion mailed on Jun. 30, 2020, received for PCT Application PCT/JP2020/015302, filed on Apr. 3, 2020, 9 pages including English Translation.

*Primary Examiner* — William J Carter
(74) *Attorney, Agent, or Firm* — XSENSUS LLP

(57) ABSTRACT

An illumination device includes light sources and a light guide member. The light guide member includes an incidence part that guides light emitted from the light sources and entering through an incidence surface towards a center of the light guide member and a central part that has a scattering surface for emitting the guided light towards an illumination target body. The light sources include a first light source facing the incidence surface and a second light source facing the incidence surface and is arranged on the central part's side relative to the first light source. The incidence part has a first curved surface that reflects the light entering through the incidence surface towards the central part and a second curved surface that is arranged on the central part's side relative to the first curved surface and reflects the light entering through the incidence surface towards the central part.

19 Claims, 14 Drawing Sheets

(56) References Cited

U.S. PATENT DOCUMENTS

| | | | |
|---|---|---|---|
| 6,496,285 B1 | 12/2002 | Fujimoto et al. | |
| 2006/0044833 A1* | 3/2006 | Li | G03B 21/2013 |
| | | | 362/616 |
| 2010/0214803 A1* | 8/2010 | Sakamoto | G02B 6/0038 |
| | | | 362/612 |
| 2015/0268405 A1 | 9/2015 | Ohno et al. | |
| 2020/0158940 A1* | 5/2020 | Toraille | G02B 6/0073 |

FOREIGN PATENT DOCUMENTS

| | | |
|---|---|---|
| JP | 11-313195 A | 11/1999 |
| JP | 2008-270885 A | 11/2008 |
| JP | 2010-193360 A | 9/2010 |
| JP | 2015-179571 A | 10/2015 |
| JP | 2017-228440 A | 12/2017 |

* cited by examiner

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

ILLUMINATION DEVICE AND IMAGE SCANNER

CROSS-REFERENCE TO RELATED APPLICATION

The present application is based on PCT filing PCT/JP2020/015302, filed Apr. 3, 2020, the entire contents of which are incorporated herein by reference.

TECHNICAL FIELD

The present disclosure relates to an illumination device and an image scanner.

BACKGROUND ART

Conventionally, as an illumination device used for an image scanner installed in an image reading device for finance or the like, there has been used an illumination device having a configuration in which LED light is made to enter a light guide member in a rodlike shape through its end face and a region for reflecting the light in a major axis direction of the light guide member is provided. An image is obtained by making photoreceptor elements receive reflected light from a target object illuminated with the illumination device. As a method for letting light enter the inside of the light guide member, a method using an end face of the light guide member as an incidence surface and placing the LED's light emission surface to parallelly face the end face of the light guide member is commonly used. However, when the diameter of the light guide member is reduced, the area of the end face decreases and thus entry efficiency of the light emitted from the LED's light emission surface decreases. Especially in an image reading device for finance that performs authentication of bank bills, it is necessary to illuminate the bank bill with light of multiple wavelengths by using a plurality of LEDs emitting visible light (RGB light), infrared (IR) light, ultraviolet (UV) light, etc. Thus, there is a danger that the light emission surfaces of some of the LEDs deviate from a region where the end face of the light guide member is situated and utilization efficiency of light decreases.

A technology for guiding light emitted from the light emission surfaces of a plurality of LEDs efficiently in the major axis direction is described in Patent Reference 1, for example. In the Patent Reference 1, light is made to enter the light guide member by using a side face of the light guide member as the incidence surface and placing the LEDs' light emission surfaces to face the side face of the light guide member. In this method, by forming an end face of the light guide member as a curved surface, the entered light is reflected by the curved surface and guided in the major axis direction. Since the area of the side face of the light guide member is larger than the area of the end face, the ratio of light incident upon the incidence surface as the side face of the light guide member in the light emitted from the LEDs' light emission surfaces is high.

PRIOR ART REFERENCE

Patent Reference

Patent Reference 1: Japanese Patent Application Publication No. 2010-193360

SUMMARY OF THE INVENTION

Problem to be Solved by the Invention

In the image reading device for finance, an image is obtained by using a plurality of single-wavelength LEDs. An ink exclusively reflecting light at a particular wavelength is used for a bank bill. Five images respectively obtained by separately illuminating the bank bill with five types of light such as R, G, B, IR and UV differ from each other in features such as the pattern. The authentication of the bank bill is performed based on a plurality of images respectively obtained at a plurality of wavelengths.

In the case where a bank bill is illuminated in the image reading device for finance, it is desirable to uniformalize the illuminance distribution in a reading region and set the illuminance level high. In order to set the illuminance level for the bank bill high, it is necessary to increase light guide efficiency.

In the configuration proposed in the Patent Reference 1, the light guide efficiency becomes higher for an LED closer to an end part of the light guide member, and the light guide efficiency becomes lower for an LED closer to the center of the light guide member. For an LED closer to the center of the light guide member, inclination of the curved surface reflecting the light incident from the LED is smaller. Accordingly, when the light reflected by the curved surface is subsequently incident upon a boundary between the light guide member and air, the incidence angle becomes large and the ratio of light not satisfying the total reflection condition increases. Further, although the variation in the light guide efficiency among the LEDs decreases as the LED spacing in the major axis direction is narrowed, the LED spacing cannot be narrowed because of wiring around the LEDs and heat radiation from the LEDs. Especially when it is attempted to downsize the light guide member, the length of the curved surface in the major axis direction also decreases, and thus the influence of the LED spacing increases relatively.

As above, the method making the light enter the light guide member through the side face has a problem in that there is a variation in the light guide efficiency between an LED arranged on the end part's side of the light guide member in the major axis direction and an LED arranged on the central side and thus there is a variation also in the illuminance level.

An object of the present disclosure, which has been made to resolve the above-described problem, is to reduce the variation in the light guide efficiency of the light emitted from a plurality of light sources.

Means for Solving the Problem

An illumination device according to the present disclosure includes a plurality of light sources and a light guide member to propagate light entering inside while reflecting the light. The light guide member includes an incidence part that has an incidence surface allowing light emitted from the plurality of light sources to enter and guides the entered light towards a center of the light guide member in its major axis direction and a central part that has a scattering surface for emitting the light guided from the incidence part towards an illumination target body. The plurality of light sources include a first light source that has a light emission surface facing the incidence surface and a second light source that has a light emission surface facing the incidence surface and is arranged on the central part's side relative to the first light source. The incidence part has a first curved surface that reflects the light entering through the incidence surface towards the central part and a second curved surface that is arranged on the central part's side relative to the first curved surface and reflects the light entering through the incidence surface towards the central part.

Effect of the Invention

According to the present disclosure, the variation in the light guide efficiency of the light emitted from the plurality of light sources can be reduced.

MODE FOR CARRYING OUT THE INVENTION

Figure 1:
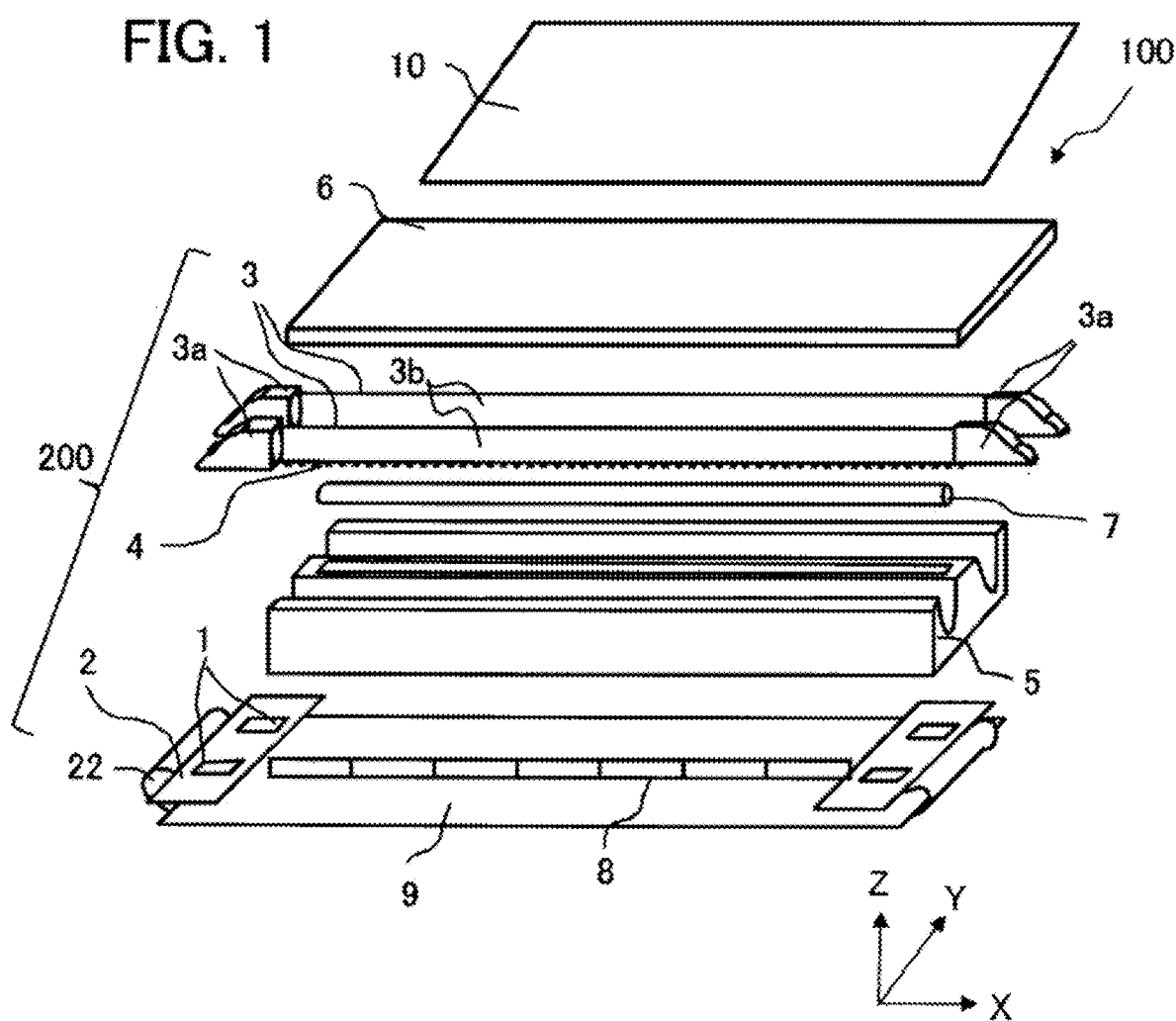
FIG. 1 is an exploded perspective view schematically showing the configuration of an image scanner according to a first embodiment.

An illumination device and an image scanner according to each embodiment will be described below with reference to the drawings. The following embodiments are just examples and it is possible to appropriately combine embodiments and appropriately modify each embodiment. While the illumination device and the image scanner according to each embodiment is installed in an image reading device for finance that scans a bank bill or the like, for example, the illumination device and the image scanner can also be installed in a different type of equipment such as a copy machine, a facsimile machine or a scanner.

In the drawings, components that are assigned the same reference character represent the same component. Further, coordinate axes of an XYZ orthogonal coordinate system as a three-dimensional orthogonal coordinate system are indicated in the drawings. An X direction parallel to an X-axis is a direction along a lengthwise direction of the light guide member (referred to also as a "major axis direction"), and a Y direction parallel to a Y-axis is a direction along a short-side direction of the light guide member (referred to also as a "minor axis direction"). Further, a Z direction parallel to a Z-axis is a direction heading from a sensor substrate towards an illumination target body (referred to also as a "height direction").

Furthermore, an X'Z' coordinate system (e.g., in FIG. 6 and FIG. 7 which will be explained later), an X"Z" coordinate system (e.g., in FIG. 6 and FIG. 7 which will be explained later) and an X'''Z''' coordinate system (e.g., in FIG. 16 and FIG. 17 which will be explained later) are also used in the drawings. These coordinate systems are coordinate systems obtained by rotating a coordinate system having an X-axis and a −Z-axis by angles $\theta_a$, $\theta_b$ and $\theta_c$.

In the present application, the illumination target body is an object that is illuminated with light by the illumination device according to each embodiment. The illumination target body is a target object as the target of the reading in the image scanner according to each embodiment.

First Embodiment

FIG. 1 is an exploded perspective view schematically showing the configuration of an image scanner 100 according to a first embodiment. As shown in FIG. 1, the image scanner 100 includes a light source unit 1 having a plurality of light sources, an LED substrate 2 provided with LEDs (Light Emitting Diodes) as the light sources, lead wires 22, a light guide member 3 in a rodlike shape that guides light, a scattering surface 4 that scatters light, a holder 5, a permeable member 6, an image capturing optical system 7, a photoreceptor element unit 8 as an image sensor, and a sensor substrate 9 on which the photoreceptor element unit 8 is mounted.

The light source unit 1 includes, for example, a plurality of LEDs emitting visible light as white light or light of red, green and blue (RGB) colors, a plurality of LEDs emitting invisible light as IR light or UV light, and so forth. The light source unit 1 includes, for example, package LEDs obtained by molding LED chips with resin, bare chip LEDs formed with bare chips or the like, organic EL (electroluminescence) elements, or the like.

The LED substrate 2 is provided with one or more light source units 1. In the example of FIG. 1, two LED substrates 2 are shown, and two light source units 1 are mounted on each LED substrate 2. Each light source unit 1 includes a plurality of light sources. The plurality of light sources are, for example, a first light source 1a and a second light source 1b shown in FIG. 2 which will be explained later. However, the number and the arrangement of the light source units 1 are not limited to those in the example of FIG. 1. Further, the number of light sources included in each light source unit 1 can also be three or more. Furthermore, the lead wires 22 include flexible cables or the like for supplying electric power to the light source units 1.

The light guide member 3 is formed with a transparent material. The transparent material is transparent resin such as acrylic or polycarbonate, glass, or the like, for example. The light guide member 3 includes two incidence parts 3a and a central part 3b arranged between the incidence parts 3a. However, the number of incidence parts 3a can also be one. Further, in FIG. 1, two light guide members 3 are arranged side by side in the Y direction. However, the number and the arrangement of the light guide members 3 are not limited to those in the example of FIG. 1.

The incidence part 3a has a function of guiding the light incident from the plurality of light sources of the light source unit 1 towards the central part 3b. In the central part 3b, part or the whole of a cross section at a plane parallel to the YZ plane is provided with curvature. To provide the cross section with curvature means that at least part of an outer periphery of the cross-sectional view shape is a curved line. In the first embodiment, the cross-sectional view shape of the central part 3b is a circular shape, an elliptical shape or the like.

The scattering surface 4 is provided on a surface of the central part 3b. The scattering surface 4 has a scattering pattern that periodically changes in the X direction as the major axis direction. The scattering pattern of the scattering surface 4 has a function of scattering the light being guided in the central part 3b while undergoing total reflection and thereby having the light emitted from the side face of the light guide member 3. Due to the scattering surface 4, the illumination target body 10 situated in the +Z direction from the light guide member 3 is illuminated with light.

The permeable member 6 is a cover glass of the image scanner 100. The permeable member 6 is formed with a transparent member in a plate-like shape, for example. The permeable member 6 allows for transmission of light while supporting the illumination target body 10 such as a manuscript or a bank bill.

The image capturing optical system 7 is a reading optical system that forms an optical image of the illumination target body 10 by converging reflected light from the illumination target body 10. The image capturing optical system 7 is, for example, a rod lens array including a plurality of rod lenses. The photoreceptor element unit 8 includes a plurality of photoreceptor elements mounted on the sensor substrate 9 in a line in the X direction and forms a line sensor. The photoreceptor element unit 8 has a function of converting the image formed by the image capturing optical system 7 into an electric signal. The holder 5 accommodates and holds the light guide member 3, the permeable member 6, the image capturing optical system 7 and so forth and fixes these components on the sensor substrate 9.

The photoreceptor element unit 8 formed with a plurality of photoreceptor elements arranged in a row in the X direction acquires an image of one line in one exposure. One image (i.e., image data) is acquired by acquiring a plurality of line images by conveying the illumination target body 10 in the Y direction and then aligning the plurality of acquired line images. In cases of acquiring images in three colors of RGB in order to acquire a color image, line images in each of the RGB colors are acquired by lighting up the LEDs for emitting light of each of the RGB colors in sync with the exposure time of each color.

Figure 2:
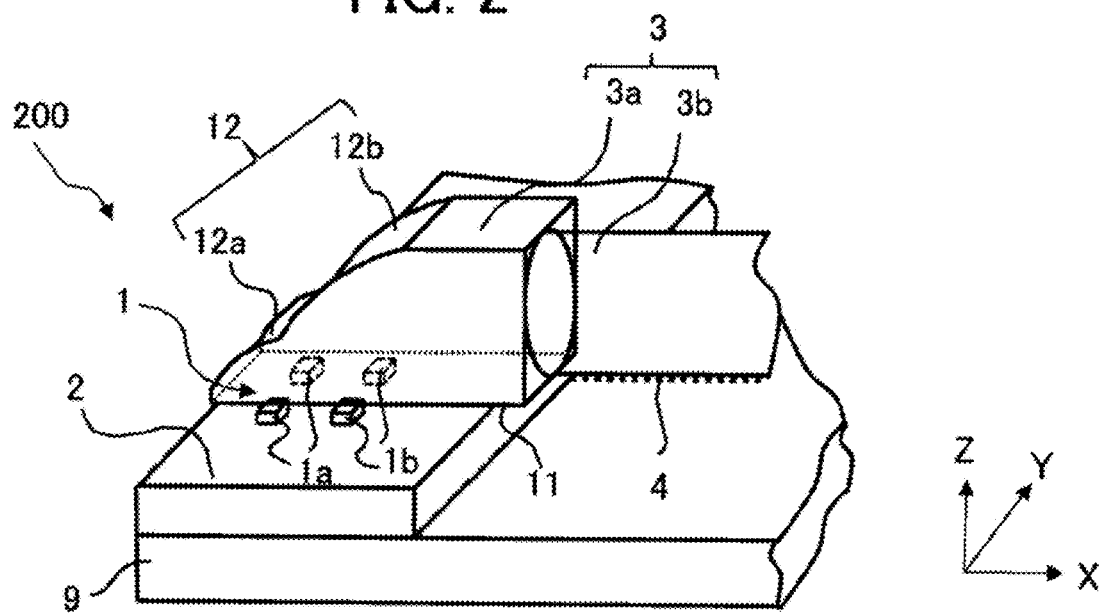
FIG. 2 is an enlarged perspective view showing an incidence part of a light guide member and a plurality of light sources in an illumination device according to the first embodiment.

FIG. 2 is an enlarged perspective view showing the incidence part 3a of the light guide member 3 and the light source unit 1 in an illumination device 200 according to the first embodiment. A cross section of the incidence part 3a at a plane parallel to the YZ plane is in a quadrangular shape. One surface (lower surface in FIG. 2) among side faces of the incidence part 3a is an incidence surface 11 facing the first light source 1a and the second light source 1b of the light source unit 1. A surface (upper surface in FIG. 2) of the incidence part 3a of the light guide member 3 opposing the incidence surface 11 is a curved surface part 12 including a plurality of steps of curved surfaces having a point where the inclination changes discontinuously. The curved surface part 12 includes a first curved surface 12a and a second curved surface 12b. A cross section of the curved surface part 12 of the incidence part 3a at a plane parallel to the XZ plane has a shape that is curved to be convex towards the outside of the light guide member 3. For example, the first curved surface 12a is a surface that is convex in a normal direction of the light emission surface of the first light source 1a and outward, and the second curved surface 12b is a surface that is convex in a normal direction of the light emission surface of the second light source 1b and outward. In the first embodiment, the shape of the cross section of the incidence part 3a at a plane parallel to the YZ plane is a quadrangular shape. However, this shape can also be a shape having curvature such as a circular shape or an elliptical shape, a polygonal shape, a shape as a combination of a curved line and a straight line, or the like. Further, a surface other than the side face opposing the incidence surface 11 may be curved in the X direction. In order to increase the light guide efficiency, the curved surface part 12 as the side face opposing the incidence surface 11 is desired to be curved in the X direction.

FIG. 2 shows a positional relationship among the incidence part 3a of the light guide member 3, the light source unit 1 and the LED substrate 2. The light source unit 1 includes a plurality of LEDs as a plurality of light sources (i.e., the first light source 1a and the second light source 1b). The plurality of LEDs are arranged in a row in the X direction and arranged to have light emission surfaces facing the incidence surface 11. The plurality of LEDs may also be arranged in a row in the minor axis direction. In this case, it is desirable to narrow the spacing in the height direction (Z direction) between the light emission surface of each LED and the incidence surface 11 as much as possible and thereby increase the entry efficiency of the light entering the inside of the light guide member 3. The light emission surface of each LED and the incidence surface 11 can be placed closest to each other by fixing the LED substrate 2 on the sensor substrate 9 and adjusting the thickness of the LED substrate 2. Alternatively, it is also possible to separately prepare a jig for adjusting the position of the LED substrate 2 in the Z direction. Incidentally, while the LED substrate 2 and the sensor substrate 9 are separate substrates in the first embodiment, it is also possible to mount the LEDs on the sensor substrate 9 by adjusting the position of the light guide member 3 in the Z direction.

In the first embodiment, each LED is formed as a bare chip. The size of the bare chip LED is 0.3 mm in width, 0.3 mm in length and 0.2 mm in height, for example. In this case, the LED spacing has to be set at 0.6 mm or more in consideration of the heat radiation and the wiring. Further, in a case where a wire for energization is projecting 0.2 mm in the height direction from the surface of the LED, the spacing between the LED and the incidence surface 11 has to be set at 0.2 mm or more.

The light source unit 1 can also be LEDs molded with resin or LEDs with a lens. However, narrowing the spacing between the LEDs is difficult, and thus the downsizing of the light guide member 3 is obstructed. Further, in the case of using LEDs molded with resin, the spacing between the light emission surface of the LED and the incidence surface 11 becomes wide, and thus light not entering the light guide member 3 increases.

Figure 3A:
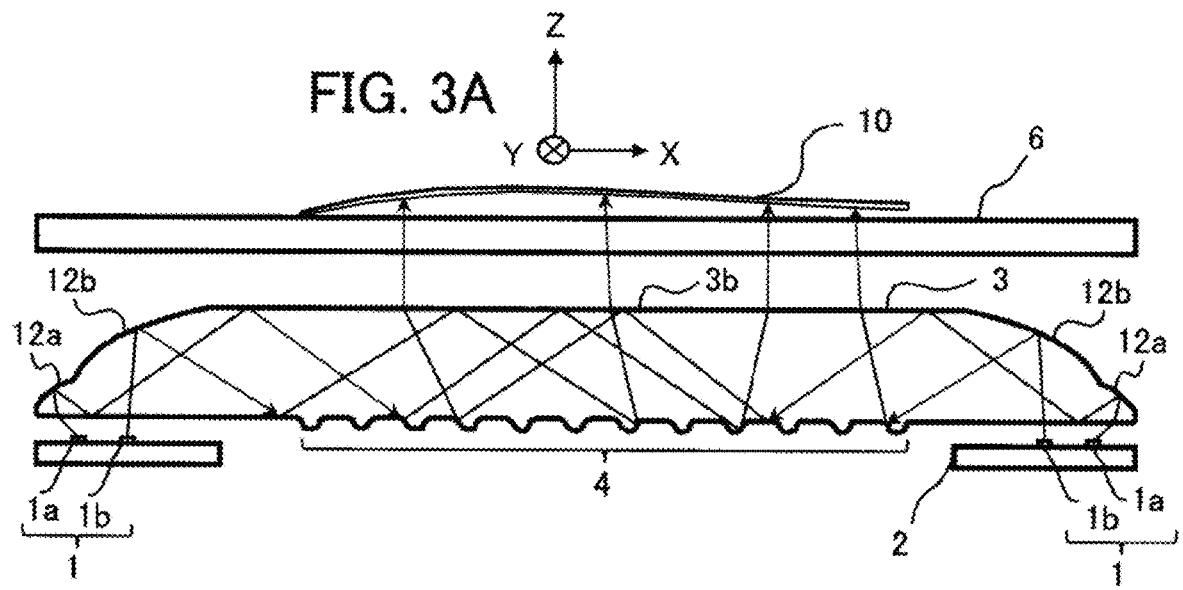
FIG. 3A is a diagram showing an example of optical paths of light emitted from the plurality of light sources, guided by the light guide member and emitted towards an illumination target body in the illumination device according to the first embodiment.
Figure 3B:
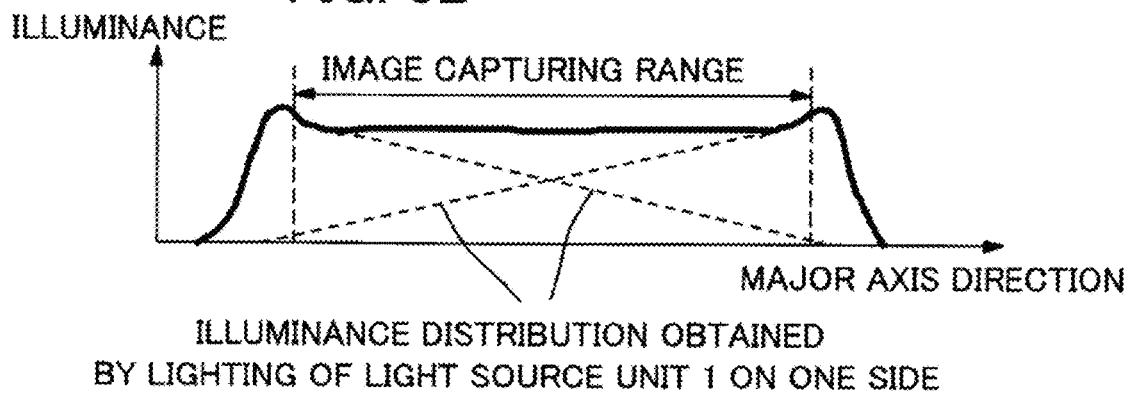
FIG. 3B is a graph showing illuminance distribution in an image capturing range.

FIG. 3A is a diagram showing an example of optical paths of light emitted from the light source unit 1, guided by the light guide member 3 and emitted towards the illumination target body 10 in the illumination device 200 according to the first embodiment, and FIG. 3B is a graph showing illuminance distribution in an image capturing range. FIG. 3A shows the optical paths of the light emitted from the first light source 1a and the second light source 1b of the light source unit 1. The light emitted from the first light source 1a and the second light source 1b enters the light guide member 3, gets reflected by the curved surface part 12, and propagates approximately in the X direction. Part of the propagating light is incident upon the scattering surface 4 and gets scattered, exits from the light guide member 3, and illuminates the illumination target body 10. As shown in FIG. 3B, the illuminance distribution in the image capturing range is desired to be uniform. In a case where the first light sources 1a and the second light sources 1b are placed on both sides of the light guide member 3 in the X direction and the first light sources 1a and the second light sources 1b are lighted up at the same time, the illuminance distribution in the image capturing range can be made uniform by forming the scattering pattern of the scattering surface 4 in the vicinity of the center of the central part 3b of the light guide member 3 to be dense and forming the scattering pattern of the scattering surface 4 on the end part's side of the central part 3b of the light guide member 3 to be sparse. Further, in a case where the first light sources 1a and the second light sources 1b are placed only on one side in the X direction and they are lighted up, the illuminance distribution can be made uniform by forming the scattering pattern of the scattering surface 4 on a side close to the first light sources 1a and the second light sources 1b to be sparse and forming the scattering pattern of the scattering surface 4 on a far side to be dense.

Figure 4:
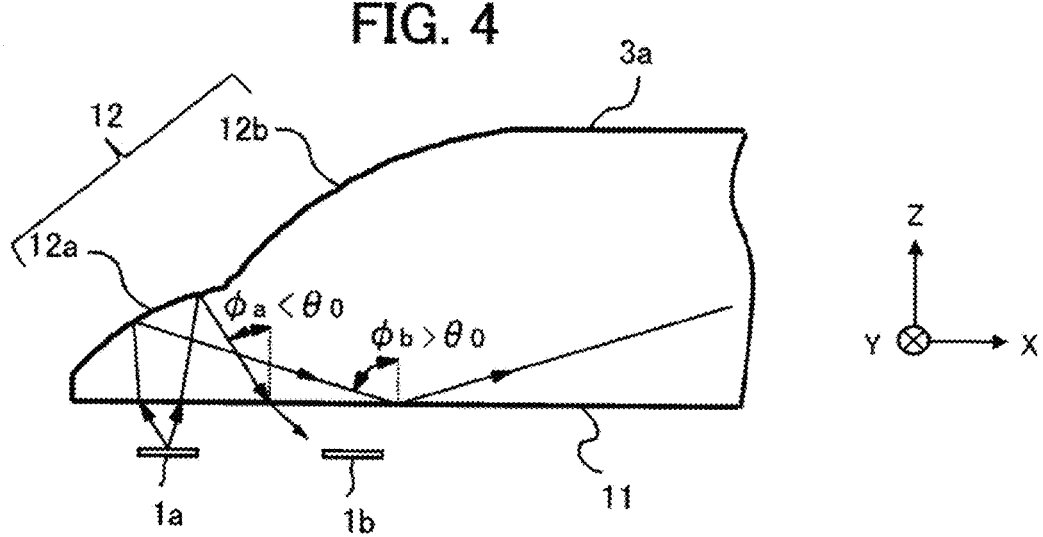
FIG. 4 is a cross-sectional view showing the incidence part of the light guide member of the illumination device according to the first embodiment.

FIG. 4 is a cross-sectional view showing the incidence part 3a of the light guide member 3 of the illumination device 200 according to the first embodiment. FIG. 4 shows a cross section of the incidence part 3a at a plane parallel to the XZ plane. In the first embodiment, a description will be given of two light sources among the plurality of light sources included in the light source unit 1. The two light sources are the first light source 1a arranged on the end part's side of the light guide member 3 in the X direction and the second light source 1b arranged on the central side of the light guide member 3 in the X direction. Assuming that the refractive index of the material of the light guide member 3 as a substance of the source of incidence is n and the refractive index of air as a substance of a destination of the light is 1, the critical angle $\theta_0$ of the light incident upon the boundary surface between the light guide member 3 and air from the inside of the light guide member 3 is represented by the following expression (1):

$$\theta_0 = \arcsin\left(\frac{1}{n}\right). \tag{1}$$

The light passes through the boundary surface between the light guide member 3 and air if the incidence angle $\phi$ of the light incident upon the boundary surface from the inside of the light guide member 3 is smaller than the critical angle $\theta_0$, or undergoes total reflection if the incidence angle $\phi$ is larger than or equal to the critical angle $\theta_0$.

In the case of acrylic, for example, the refractive index n is 1.49 and the critical angle $\theta_0$ is 42.2°. Let $\phi_a$ and $\phi_b$ respectively represent incidence angles of the light entering the inside of the light guide member 3 from the first light source 1a and the second light source 1b and reflected by the curved surface part 12 when the light is subsequently incident upon a side face of the light guide member 3, light satisfying $\phi_a > \phi_0$ and light satisfying $\phi_b > \phi_0$ are guided inside the light guide member 3. The shape of a cross section of the curved surface part 12 at a plane parallel to the XZ plane can also be a circular shape, an elliptical shape or the like. However, in a case where the cross section is in such a shape, it is difficult to restrict the direction of the reflected light from the curved surface part 12. Therefore, in the first embodiment, the shape of the cross section of each of the first curved surface 12a and the second curved surface 12b of the curved surface part 12 at the plane parallel to the XZ plane is a parabola. Namely, each of the first curved surface 12a and the second curved surface 12b is a part of a paraboloid as a body of revolution of a parabola. Further, in the case where each of the first curved surface 12a and the second curved surface 12b is a part of a paraboloid, the height of the curved surface part 12 in the Z direction can be made low.

Figure 5A:
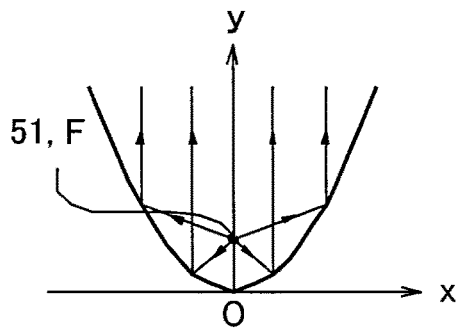
FIGS. 5A to 5C are diagrams showing optical paths of light reflected by a paraboloid.
Figure 5B:
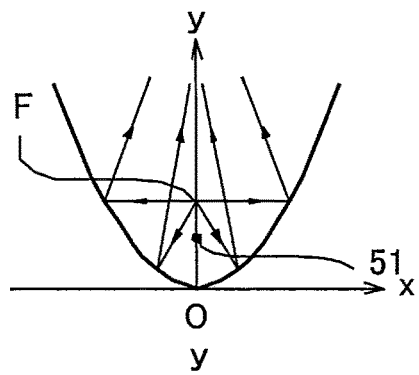
Figure 5C:
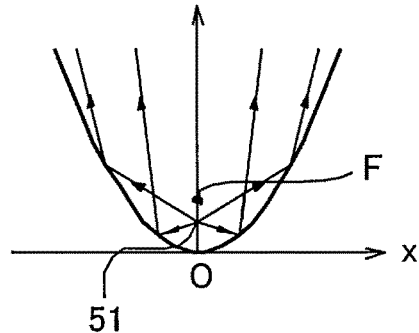

FIGS. 5A to 5C are diagrams showing optical paths of light reflected by a paraboloid. Let O represent the origin in an xy coordinate system, a parabola y having its apex at the origin O is represented by the following expression (2) by using a curvature radius R at the apex:

$$y = \frac{1}{2R}x^2. \tag{2}$$

In this case, as shown in FIG. 5A, light emitted from a light source 51 placed at a focal point F of the parabola y is reflected at the parabola and travels in parallel with the parabola axis (i.e., y-axis) (namely, in the +y direction). Further, as shown in FIG. 5B, light emitted from the light source 51 placed on the +y side relative to the focal point F is reflected at the parabola y and then travels to approach the parabola axis (i.e., y-axis). Furthermore, as shown in FIG. 5C, light emitted from the light source 51 placed on the −y side relative to the focal point F is reflected at the parabola y and then travels to separate from the parabola axis (i.e., y-axis). As above, the curved surface in the paraboloidal shape is capable of restricting the angle of the reflected light depending on the positional relationship between the light source 51 and the focal point F, and thus the designing is facilitated.

Incidentally, in the first embodiment, there are cases where part of the light emitted from the light source unit 1 and entering the curved surface part 12 leaks to the outside of the light guide member 3 without being reflected. Therefore, it is also possible to increase the light guide efficiency and increase the light utilization efficiency by forming a reflective coating on the curved surface part 12 by means of aluminum evaporation or the like.

Figure 6:
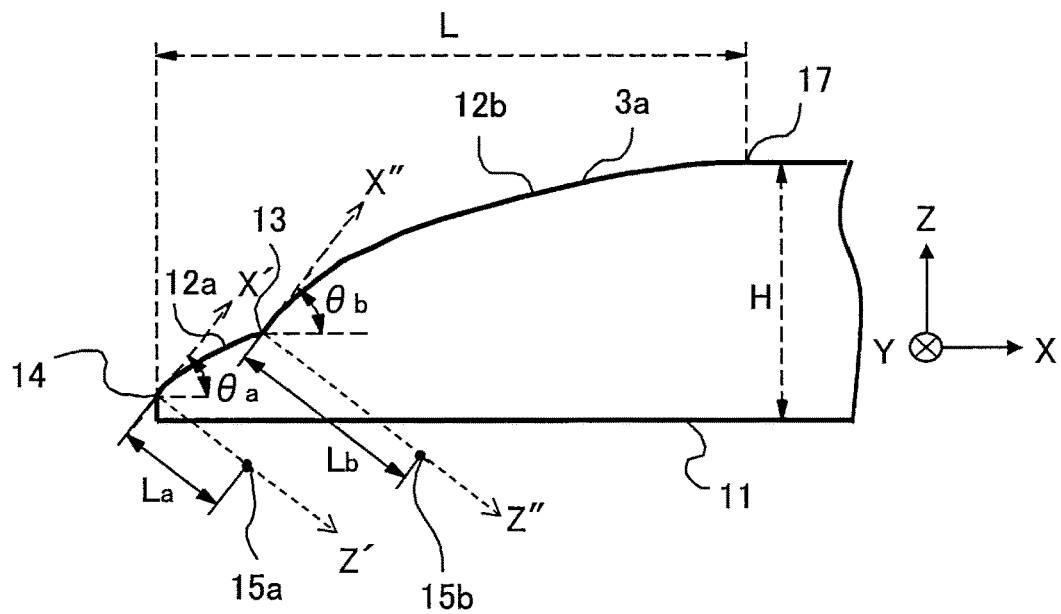
FIG. 6 is a cross-sectional view showing the incidence part having a curved surface in a paraboloidal shape in the light guide member of the illumination device according to the first embodiment.

FIG. 6 is a cross-sectional view showing the incidence part 3a having a curved surface in the paraboloidal shape in the light guide member 3 of the illumination device 200 according to the first embodiment. FIG. 6 shows a cross section of the incidence part 3a at a plane parallel to the XZ plane. In the first embodiment, the curved surface part 12 is formed of the first curved surface 12a and the second curved surface 12b. Each of the first curved surface 12a and the second curved surface 12b is a parabola on the cross section at the plane parallel to the XZ plane. The first curved surface 12a and the second curved surface 12b are connected to each other at a discontinuity point 13. Incidentally, while the discontinuity point 13 is a point on the cross section, the discontinuity point 13 in reality is a boundary line between the first curved surface 12a and the second curved surface 12b.

The parabola on the cross section of the first curved surface 12a is on the basis of an X'-axis and a Z'-axis obtained by defining an end point 14 in an end part of the light guide member 3 as the origin and rotating an axis pointing in the +X direction and an axis pointing in the −Z direction as the height direction on the plane parallel to the XZ plane by the angle $\theta_a$, namely, the X'Z' coordinate system. In this case, assuming that the curvature radius at the origin is $R_a$, the focal length $L_a$ equals $2R_a$ and the equation of the parabola Z' formed by the first curved surface 12a is represented as the following expression (3):

$$Z' = \frac{1}{2R_a} X'^2 \ (Z' \geq 0). \tag{3}$$

The parabola on the cross section of the second curved surface 12b is on the basis of an X"-axis and a Z"-axis obtained by defining the discontinuity point 13 as the origin and rotating an axis pointing in the +X direction and an axis pointing in the −Z direction as the height direction on the plane parallel to the XZ plane by the angle $\theta_b$. In this case, assuming that the curvature radius at the origin is $R_b$, the focal length $L_b$ equals $2R_b$ and the equation of the parabola Z" formed by the second curved surface 12b is represented as the following expression (4):

$$Z'' = \frac{1}{2R_b} X''^2 \ (Z'' \geq 0). \tag{4}$$

The second curved surface 12b turns into a plane parallel to the XY plane when it reaches a top surface of the light guide member 3 in regard to the Z direction. The length of the light guide member 3 in the Z direction is represented by H in FIG. 6. For example, H=2 mm. Further, the length of the curved surface part 12 in the X direction is represented by L in FIG. 6. For example, L=2 mm.

Figure 7A:
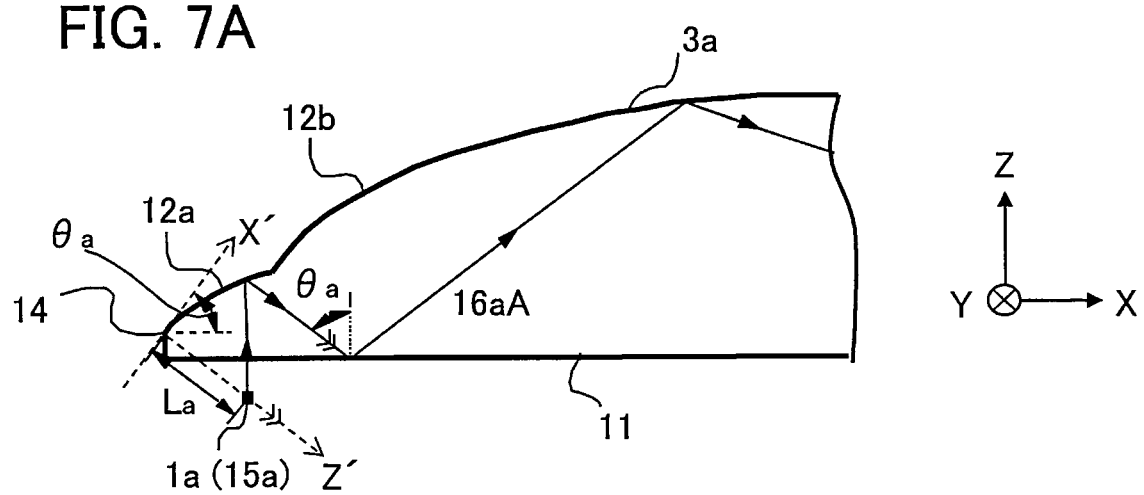
FIGS. 7A and 7B are cross-sectional views showing optical paths of light in the incidence part of the light guide member of the illumination device according to the first embodiment.
Figure 7B:
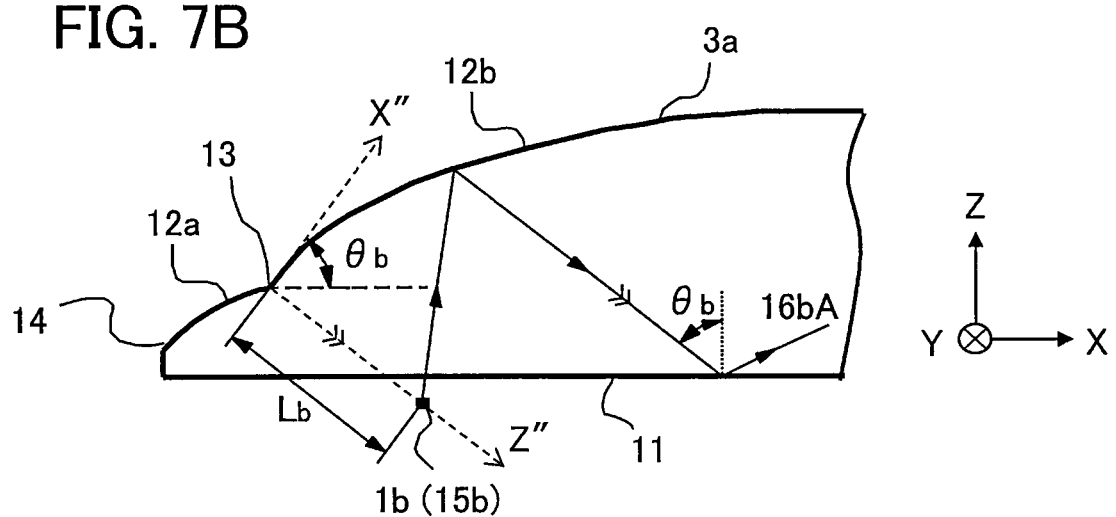

Here, a description will be given of a principle based on which sufficient light guide efficiency is obtained by the first embodiment. FIGS. 7A and 7B are cross-sectional views showing optical paths of light in the incidence part 3a of the light guide member 3 of the illumination device 200 according to the first embodiment. The inclination angle $\theta_a$ of the parabola axis (i.e., Z'-axis) of the first curved surface 12a with respect to the −Z direction and the inclination angle $\theta_b$ of the parabola axis (i.e., Z"-axis) of the second curved surface 12b with respect to the −Z direction are made equal to the critical angle $\theta_0$. Namely, the first curved surface 12a and the second curved surface 12b are formed in shapes satisfying $\theta_a = \theta_b = \theta_0$.

A focal point 15a of the first curved surface 12a is determined as a point that is the focal length $L_a$ away from the end point 14 in the Z' direction. As shown in FIG. 7A, the first light source 1a is placed at the focal point 15a. The first light source 1a is drawn as a point in order to facilitate the understanding of the description. In reality, it is necessary to place the first light source 1a at a virtual focal position in consideration of refraction of light at the incidence surface 11. However, it is assumed in this embodiment that there is no refraction at the incidence surface 11. A ray 16aA in FIG. 7A is a ray that is emitted from the first light source 1a and reflected by the first curved surface 12a. The ray 16aA reflected by the first curved surface 12a becomes parallel to the parabola axis, and thus satisfies $\phi_a = \theta_0$ and is guided approximately in the +X direction.

Further, a focal point 15b of the second curved surface 12b is determined as a point that is the focal length $L_b$ away from the discontinuity point 13 in the Z" direction. As shown in FIG. 7B, the second light source 1b is placed at the focal point 15b. The second light source 1b is assumed to be a point in order to facilitate the understanding of the description. A ray 16bA in FIG. 7B is a ray that is emitted from the second light source 1b and reflected by the first curved surface 12b. When reflected by the second curved surface 12b, the light emitted from the second light source 1b becomes parallel to the parabola axis, and thus satisfies $\phi_b = \theta_0$ and is guided in the +X direction.

Figure 8A:
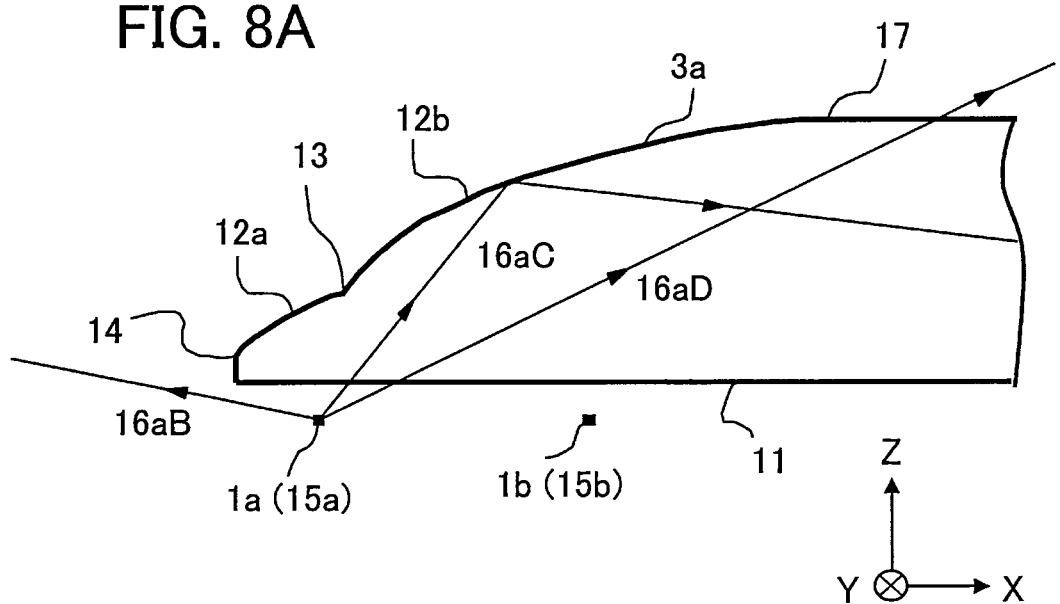
FIGS. 8A and 8B are cross-sectional views showing optical paths of light in the incidence part of the light guide member of the illumination device according to the first embodiment.
Figure 8B:
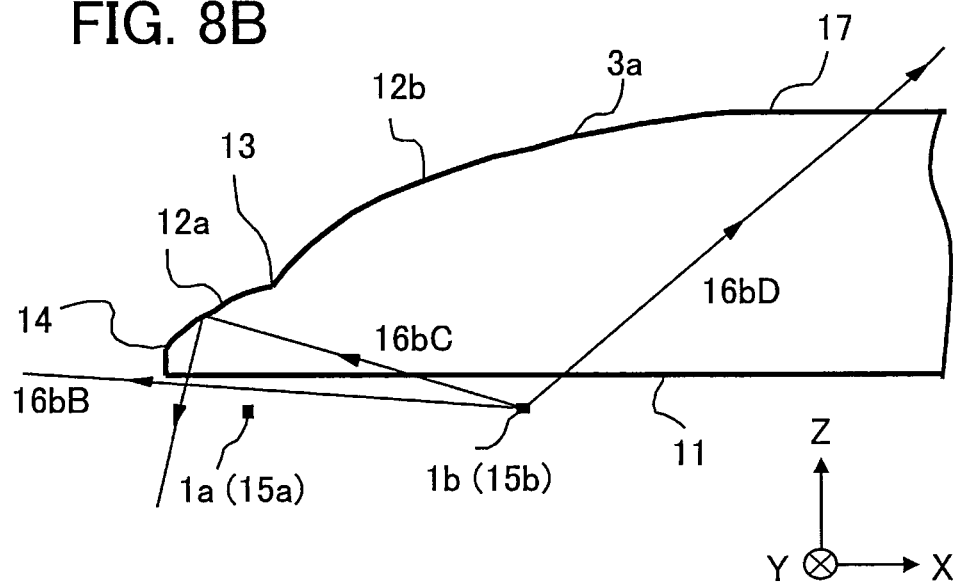
Figure 9A:
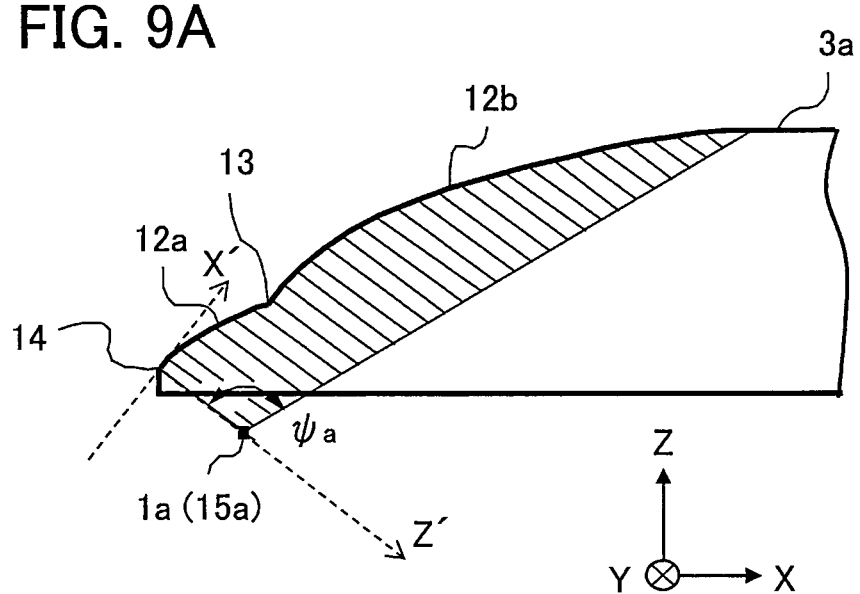
FIGS. 9A and 9B are cross-sectional views showing ranges of a light guide emission angle in the incidence part of the light guide member of the illumination device according to the first embodiment.
Figure 9B:
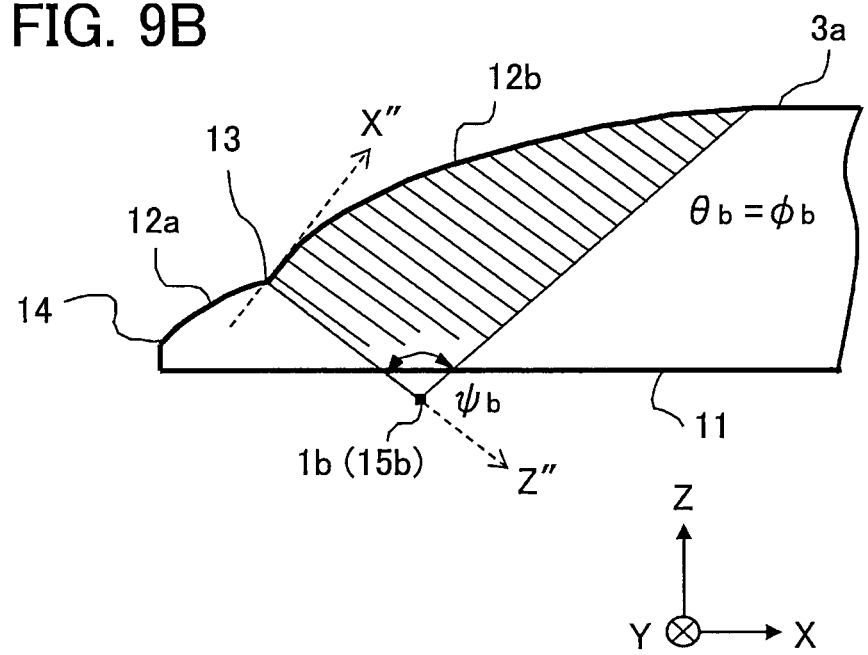

FIGS. 8A and 8B are cross-sectional views showing optical paths of light in the incidence part 3a of the light guide member 3 of the illumination device 200 according to the first embodiment. FIGS. 9A and 9B are cross-sectional views showing ranges of a light guide emission angle in the incidence part 3a of the light guide member 3 of the illumination device 200 according to the first embodiment.

FIG. 8A shows rays emitted from the first light source 1a placed at the focal point 15a of the first curved surface 12a other than the ray 16aA (shown in FIG. 7A). A ray 16aB is a ray that is not incident upon the incidence surface 11, which increases as the first light source 1a approaches the end part's side of the light guide member 3 (in the −X direction in this example). A ray 16aC is a ray that enters the light guide member 3 and is reflected by the second curved surface 12b. The ray 16aC is incident upon the second curved surface 12b at a large incidence angle, and thus is guided approximately in the +X direction. A ray 16aD is a ray that is directly incident upon a flat surface part on the +X direction side relative to an end point 17 of the second curved surface 12b, which leaks to the outside of the light guide member 3 without undergoing total reflection. In the light emitted from the first light source 1a, the ray 16aA and the ray 16aC satisfy a light guide condition, and thus light emitted within an angle $\psi_a$ range (i.e., hatched range) shown in FIG. 9A is guided inside the light guide member 3.

FIG. 8B shows rays emitted from the second light source 1b placed at the focal point 15b of the second curved surface 12b other than the ray 16bA (shown in FIG. 7B). A ray 16bB is a ray that is not incident upon the incidence surface 11, which increases as the second light source 1b approaches the end part's side of the light guide member 3 (in the −X direction in this example). A ray 16bC is a ray that is reflected by the first curved surface 12a. The ray 16bC is incident upon the first curved surface 12a at a small incidence angle, and thus leaks to the outside of the light guide member 3. A ray 16bD is a ray that is directly incident upon the flat surface part on the +X direction side relative to the end point 17 of the second curved surface 12b, which leaks to the outside of the light guide member 3 without undergoing total reflection. In the light emitted from the second light source 1b, only the ray 16bA satisfies the light guide condition, and thus light emitted within an angle $\psi_b$ range (i.e., hatched range) shown in FIG. 9B is guided inside the light guide member 3.

The above description has been given of the case where the first light source 1a is placed at the focal point 15a of the first curved surface 12a and the case where the second light source 1b is placed at the focal point 15b of the second curved surface 12b. However, in reality, each light source may be arranged around the focal position, that is, at a position slightly deviated from the focal position, in consideration of the refraction occurring at the incidence surface 11 and the fact that the first light source 1a and the second light source 1b are not points but surfaces each having a width in the X direction.

Figure 10A:
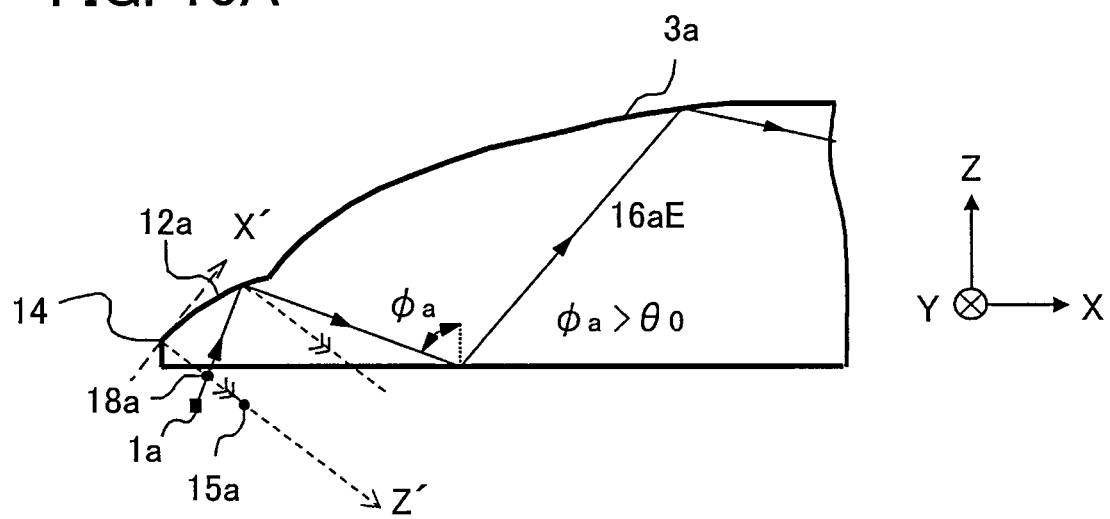
FIGS. 10A and 10B are cross-sectional views showing optical paths of light in the incidence part of the light guide member of the illumination device according to the first embodiment.
Figure 10B:
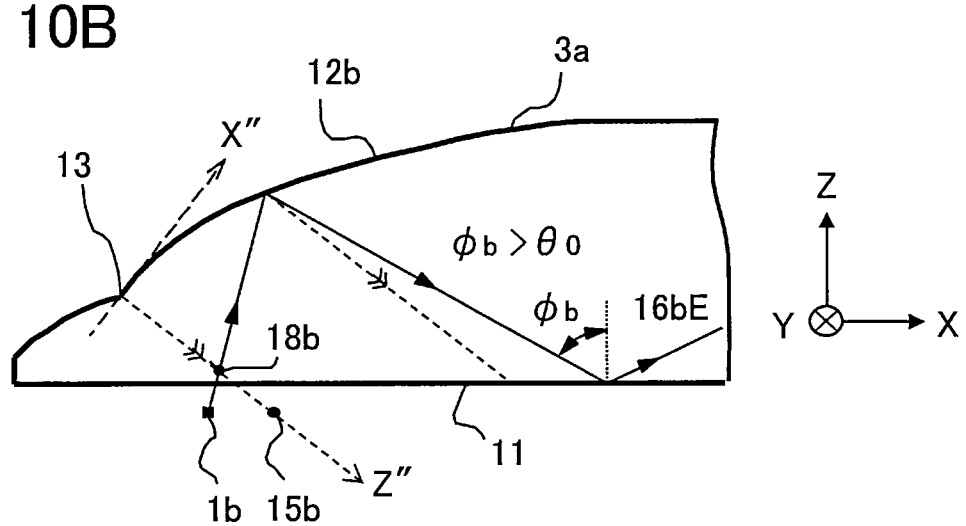

FIGS. 10A and 10B are cross-sectional views showing optical paths of light in the incidence part 3a of the light guide member 3 of the illumination device 200 according to the first embodiment. In reality, the first light source 1a is placed on the light guide member 3's end part's side relative to the focal point 15a as shown in FIG. 10A. A ray 16aE emitted from the first light source 1a and reflected by the first curved surface 12a intersects with the Z'-axis at a point between the end point 14 and the focal point 15a, and thus the ray 16aE travels in the same way as light emitted from the intersection point 18a on the Z'-axis. Thus, as explained with reference to FIG. 5C, the light reflected by the first curved surface 12a travels outward relative to the direction parallel to the Z'-axis and satisfies $\phi_a > \theta_0$. The same goes for the second light source 1b and the second curved surface 12b as shown in FIG. 10B and a ray 16bE satisfies $\phi_0 > \theta_0$.

As above, by arranging the first light source 1a and the second light source 1b respectively on the light guide member 3's end part's side relative to the focal point 15a and the focal point 15b, it is possible to obtain emission angle ranges enabling the light guiding inside the light guide member 3 like the angle $\psi_a$ and the angle $\psi_b$. However, if the first light source 1a and the second light source 1b are shifted towards the light guide member 3's end part's side, light not incident upon the incidence surface 11 like the ray 16aB and the ray 16bB in FIGS. 8A and 8B increases and the angle $\psi_a$ and the angle $\psi_b$ become smaller, and thus the light guide efficiency decreases. Therefore, it is desirable to place the first light source 1a on the light guide member 3's central side relative to the end point 14 and place the second light source 1b on the light guide member 3's central side relative to the discontinuity point 13.

Further, in this example, the inclination angles $\theta_a$ and $\theta_b$ of the parabola axes of the first curved surface 12a and the second curved surface 12b are set to satisfy $\theta_a = \theta_b = \theta_0$. In reality, because of the fact that refraction occurs at the incidence surface 11 or the first light source 1a and the second light source 1b have certain widths in the X direction, it is desirable to provide the reflected light from the curved surface part 12 with a margin in regard to the light guide condition by setting the angles to satisfy $\theta_a > \theta_0$ and $\theta_b > \theta_0$.

It is also possible to set the inclination angles $\theta_a$ and $\theta_b$ of the parabola axes to satisfy $\theta_a < \theta_0$ and $\theta_b < \theta_0$ in order to reduce the size of the light guide member 3 in the height direction. In this case, if the first light source 1a and the second light source 1b are arranged respectively at the focal points 15a and 15b, there appears light that is not guided even if it is reflected by the curved surface part 12, and thus it is desirable, in order to increase the light guide efficiency, to shift the first light source 1a and the second light source 1b towards the light guide member 3's end part's side.

Next, reduction in the variation in the light guide efficiency of the light emitted from the two light sources arranged in a row in the X direction achieved by the first embodiment will be described below by comparing the illumination device 200 in the first embodiment with a comparative example in which the curved surface part 12 has no discontinuity point 13 and is formed of one curved surface.

Figure 11A:
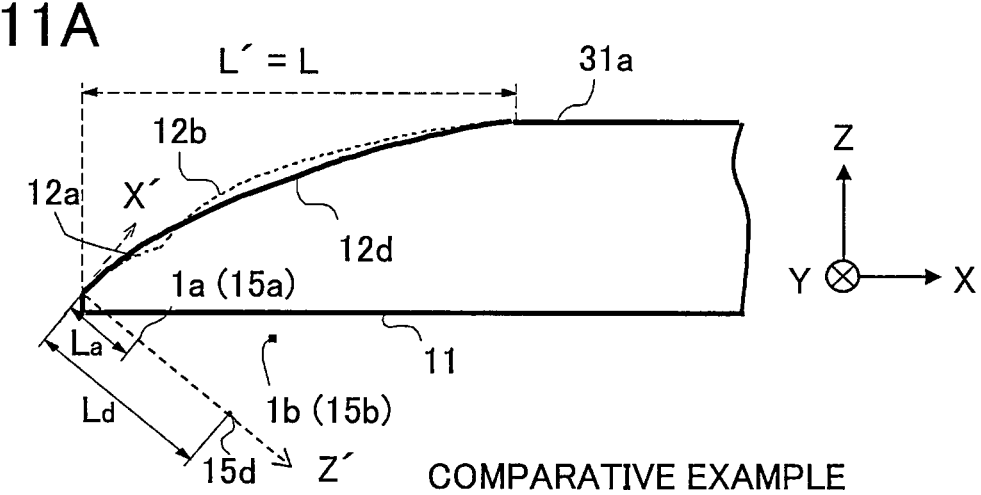
FIGS. 11A to 11C are cross-sectional views showing optical paths of light in an incidence part having a one-step curved surface in a light guide member of an illumination device as a comparative example.
Figure 11B:
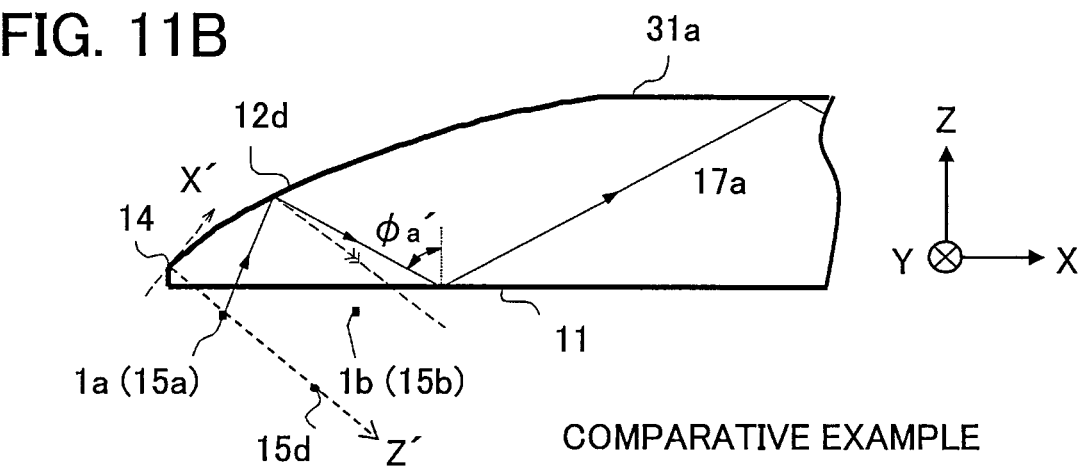
Figure 11C:
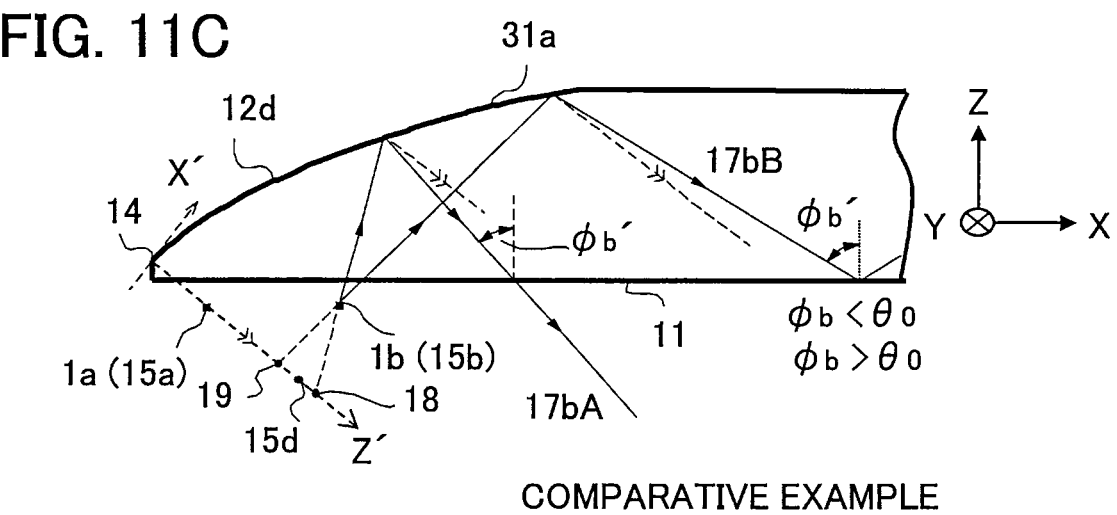
Figure 12A:
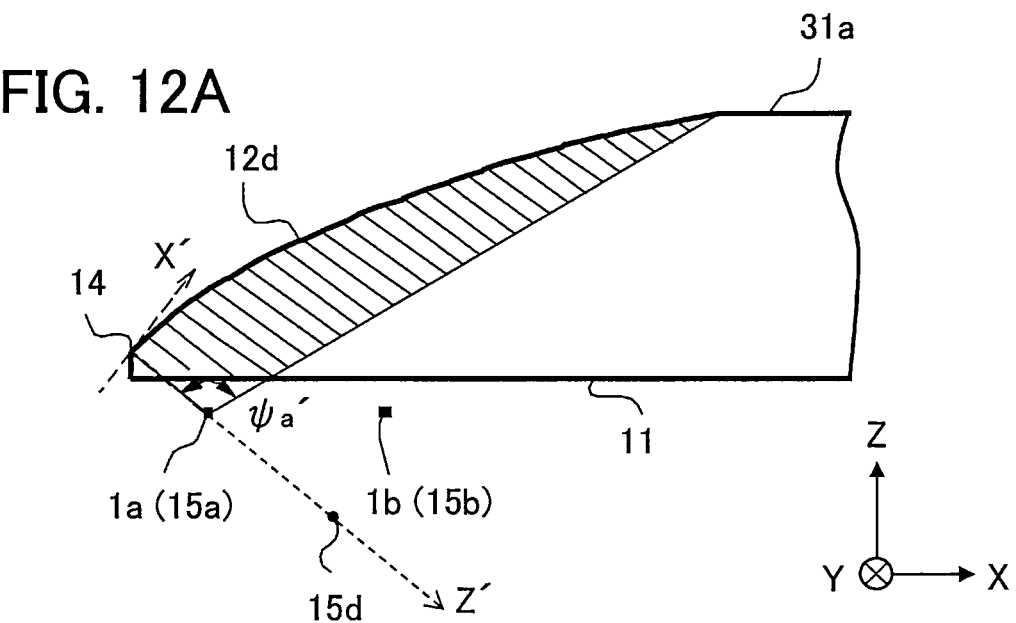
FIGS. 12A and 12B are cross-sectional views showing ranges of the light guide emission angle in the incidence part having the one-step curved surface in the light guide member of the illumination device as the comparative example.
Figure 12B:
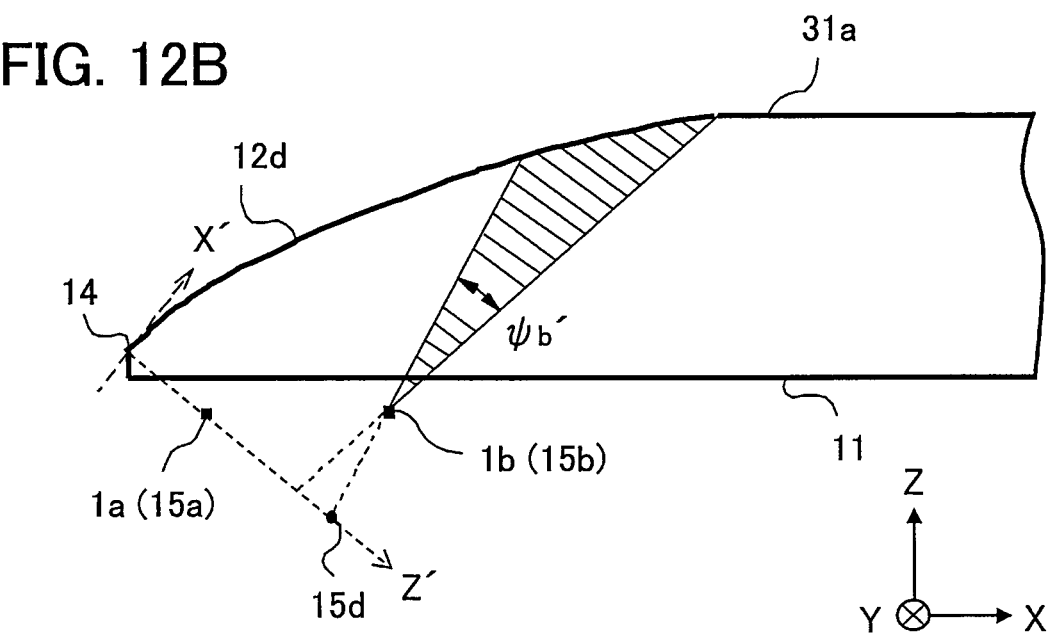

FIGS. 11A to 11C are cross-sectional views showing optical paths of light in an incidence part 31a having a one-step curved surface in a light guide member of an illumination device as the comparative example. FIGS. 12A and 12B are cross-sectional views showing ranges of the light guide emission angle in the incidence part 31a having the one-step curved surface 12d in the light guide member of the illumination device as the comparative example. Here, the one-step curved surface 12d is one curved surface having no discontinuity point.

FIG. 11A shows a cross section of the light guide member whose curved surface 12d is formed of one curved surface at a plane parallel to the XZ plane. In this case, for the curved surface 12d, similarly to the case of the first curved surface 12a, the end point 14 in the end part of the light guide member is defined as the origin and the parabola axis is rotated on the plane parallel to the XZ plane by the angle $\theta_0$. The length L' of the curved surface 12d in the X direction is made equal to the length L of the first curved surface 12a and the second curved surface 12b in the X direction in the first embodiment. In this case, a relationship between a curvature radius $R_d$ of the curved surface 12d and a curvature radius $R_a$ of the first curved surface 12a is $R_d > R_a$. Thus, a focal length $L_d$ of the curved surface 12d satisfies $L_d > L_a$. A focal point of the curved surface 12d is represented as 15d. A ray 17a in FIG. 11B is a ray emitted from the first light source 1a and reflected by the curved surface 12d. The first light source 1a is situated on the end point 14's side relative to the focal point of the curved surface 12d, and thus as shown in FIG. 5C, the ray 17a reflected by the curved surface 12d travels outward relative to a line parallel to the Z'-axis and satisfies $\phi_a' > \theta_0$. Accordingly, in the light emitted from the first light source 1a, the whole of light reflected by the curved surface 12d is guided. Therefore, in the case of the first light source 1a, when light is emitted within an angle $\psi_a'$ range in FIG. 12A, the light is guided inside the light guide member.

On the other hand, FIG. 11C shows the state of the light guiding of rays emitted from the second light source 1b. Whether the light emitted from the second light source 1b is guided inside the light guide member or not depends on the position of an intersection point of the Z'-axis and the ray when the ray is extended towards the Z'-axis'es side. A ray 17bA intersects with the Z'-axis at an intersection point 18. Since the intersection point 18 is situated on the +Z' side relative to the focal point 15d, the ray 17bA reflected by the curved surface 12d travels inward relative to the direction parallel to the Z'-axis as explained with reference to FIG. 5B. Thus, Ob' of the ray 17bA satisfies $\phi_b'<\theta_0$ and the ray 17bA is not guided inside the light guide member.

In contrast, a ray 17bB intersects with the Z'-axis at an intersection point 19. Since the intersection point 19 is situated on the end point 14's side relative to the focal point 15d, the ray 17bB reflected by the curved surface 12d travels outward relative to the direction parallel to the Z'-axis as explained with reference to FIG. 5C. Thus, $\phi_b'$ of the ray 17bB satisfies $\phi_b'>\theta_0$ and the ray 17bB is guided inside the light guide member. Therefore, in the case of the second light source 1b, when light is emitted within an angle $\psi_b'$ range in FIG. 12B, the light is guided inside the light guide member.

Accordingly, to compare the first embodiment in which the curved surface part 12 of the incidence part 3a has the two-step curved surface with the comparative example in which the incidence part 31a has the one-step curved surface 12d, the following relationships hold:

$$\psi_a=\psi_a', \psi_b>\psi_b'.$$

The magnitude relationship regarding the emission angle range for the light guiding coincides with the magnitude relationship regarding the light guide efficiency. Since $|\psi_a-\psi_b|<|\psi_a'-\psi_b'|$ holds, the variation in the light guide efficiency is reduced in the first embodiment compared to the case of the comparative example in which the curved surface 12d is formed of one curved surface.

Figure 13A:
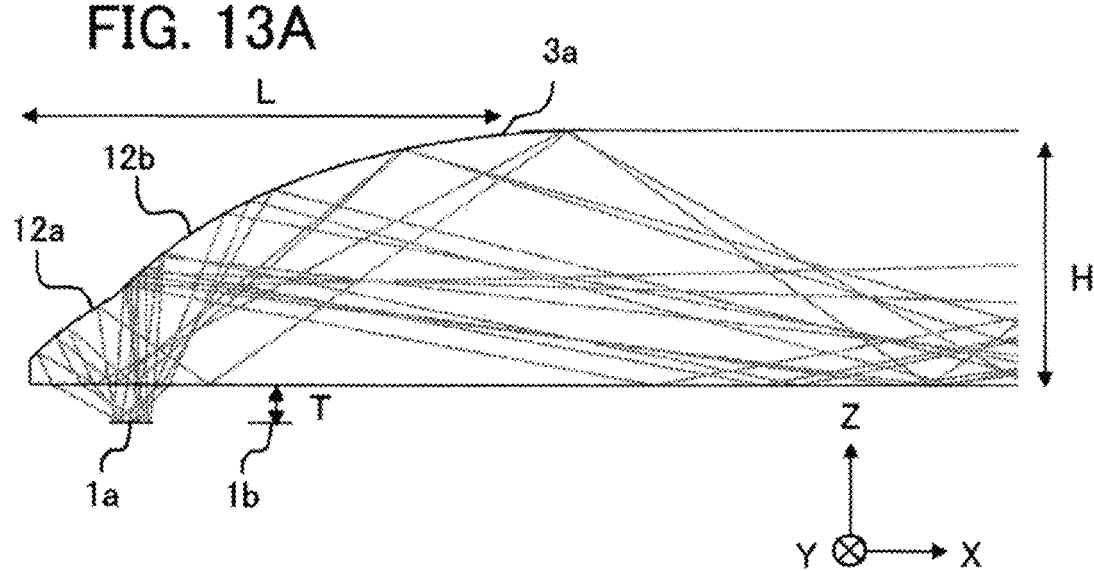
FIGS. 13A to 13C are optical simulation diagrams showing optical paths in the incidence part having a two-step curved surface in the light guide member of the illumination device according to the first embodiment.
Figure 13B:
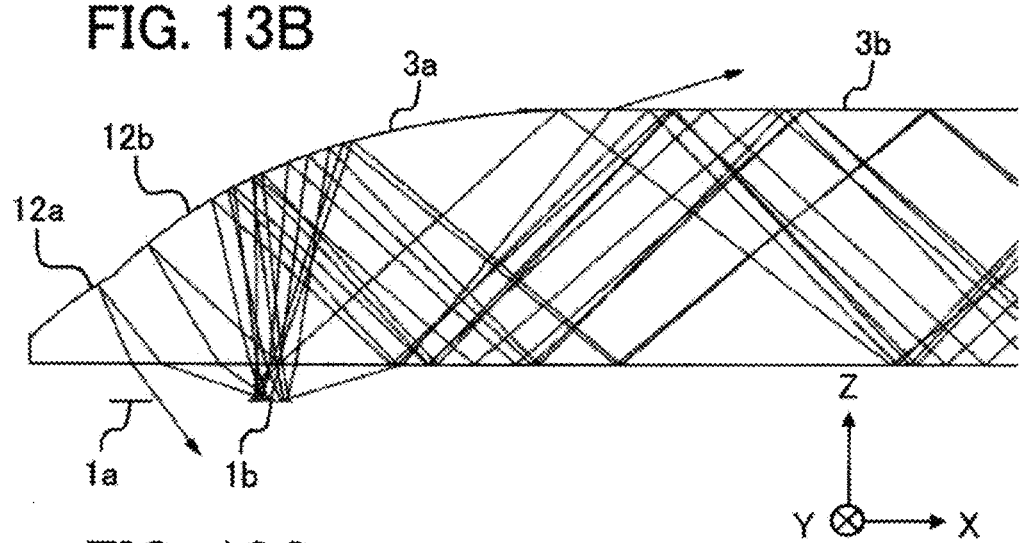
Figure 13C:
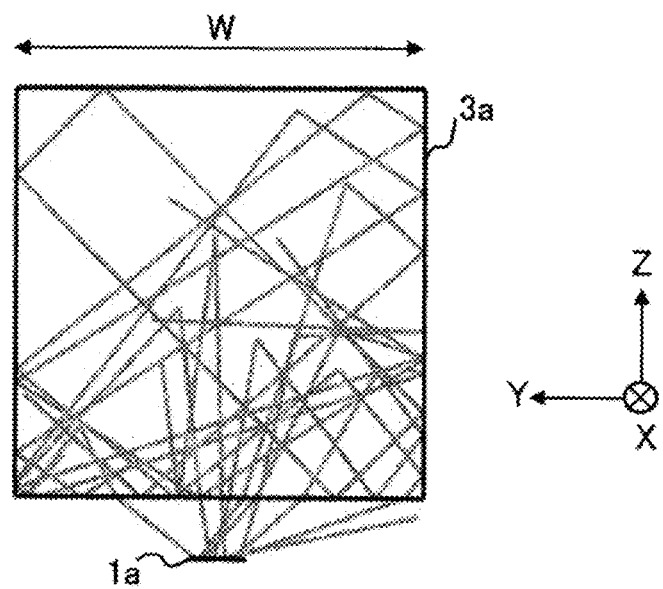

FIGS. 13A to 13C are optical simulation diagrams showing optical paths in the incidence part 3a having the two-step curved surface in the light guide member 3 of the illumination device 200 according to the first embodiment. FIGS. 13A to 13C show a state in which the light emitted from the first light source 1a and the second light source 1b in the first embodiment is guided in the X direction. The size of the light source is 0.3 mm×0.3 mm and the spacing t between the incidence surface 11 and the light emission surface is 0.3 mm. The thickness H of the light guide member 3 is 2 mm and the width W is 2 mm. The material of the light guide member 3 is acrylic, the refractive index is n=1.49, and the critical angle is $\theta_0=42.2°$. In the first curved surface 12a and the second curved surface 12b, the inclination angles $\theta_a$ and $\theta_b$ of the parabola axes are 45° and these angles are larger than the critical angle $\theta_0$. The length of the entire curved surface part 12 in the X direction is 4.2 mm, for example. The first light source 1a and the second light source 1b are respectively arranged in the vicinity of the parabola axes of the first curved surface 12a and the second curved surface 12b, and the distance between the first curved surface 12a and the second curved surface 12b in the X direction is set at 0.7 mm. The curved surface part 12 has undergone aluminum evaporation. In this case, the light guide efficiency of the light emitted from the first light source 1a shown in FIG. 13A is 78%, and the light guide efficiency of the light emitted from the second light source 1b shown in FIG. 13B is 77%. As above, the variation between the light guide efficiency of the light emitted from the first light source 1a and the light guide efficiency of the light emitted from the second light source 1b is small.

Figure 14A:
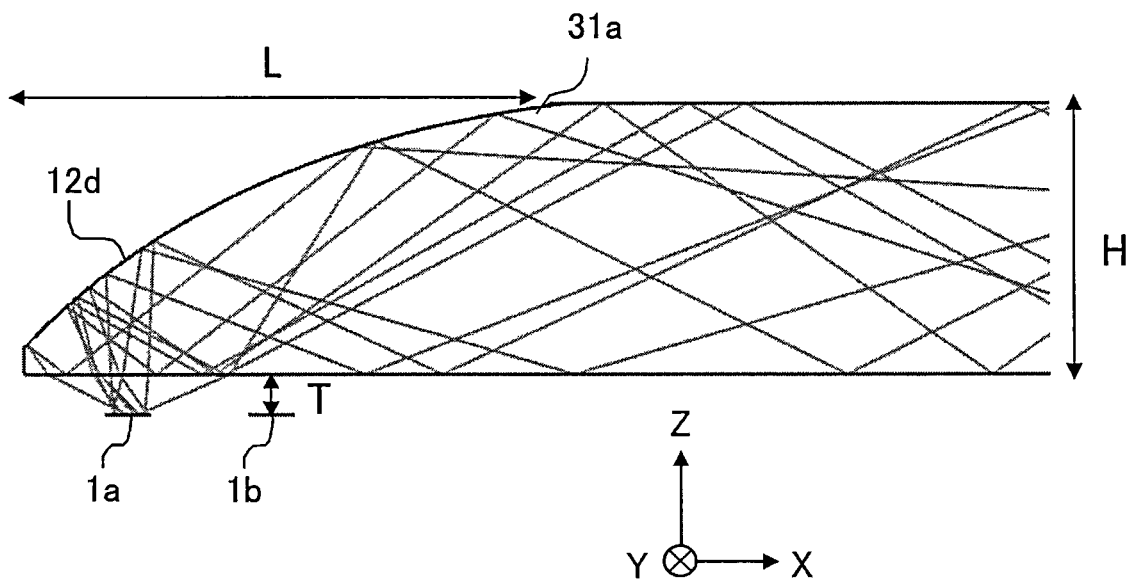
FIGS. 14A and 14B are optical simulation diagrams showing optical paths in the incidence part having the one-step curved surface in the light guide member of the illumination device as the comparative example.
Figure 14B:
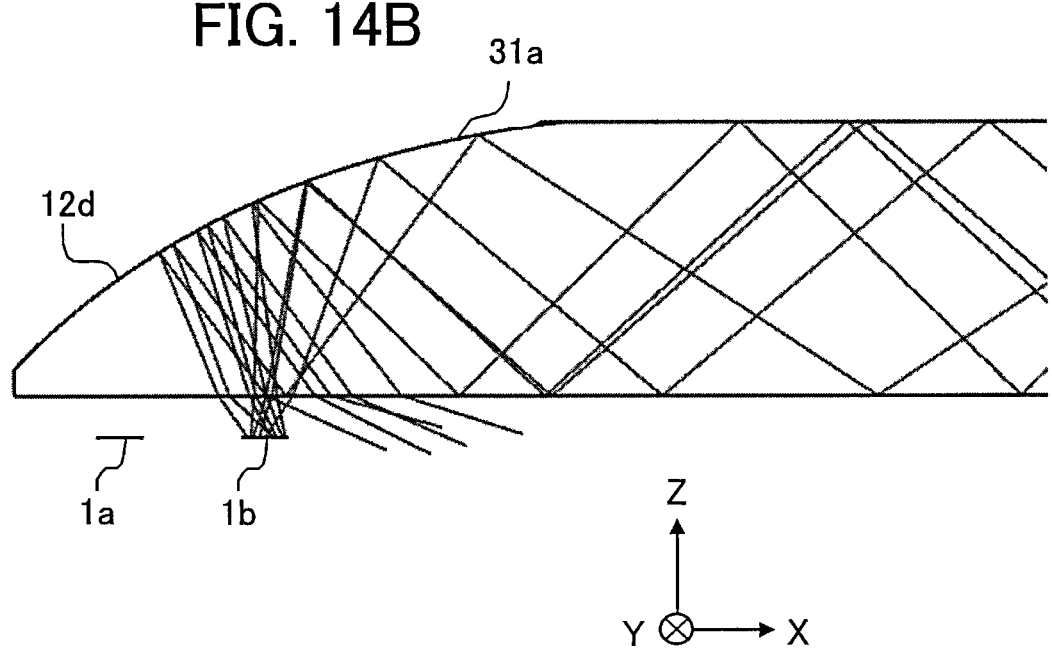

FIGS. 14A and 14B are optical simulation diagrams showing optical paths in the incidence part 31a having the one-step curved surface 12d in the light guide member of the illumination device as the comparative example. FIGS. 14A and 14B show the state of the light guiding in the case where the curved surface 12d has no discontinuity point 13 and is formed of one curved surface. Parameters other than those of the curved surface 12d are the same as those in the first embodiment. The inclination of the parabola axis of the curved surface 12d is also the same as that (45°) in the first embodiment, and the length L of the curved surface 12d in the X direction is the same as the length of the combination of the first curved surface 12a and the second curved surface 12b in the first embodiment. In this case, the light guide efficiency of the light emitted from the first light source 1a shown in FIG. 14A is 78%, and the light guide efficiency of the light emitted from the second light source 1b shown in FIG. 14B is 61%. As above, in the comparative example, the variation between the light guide efficiency of the light emitted from the first light source 1a and the light guide efficiency of the light emitted from the second light source 1b is large compared to that in the case of the first embodiment, and the light guide efficiency drops.

As described above, with the illumination device 200 according to the first embodiment, it becomes possible to reduce the variation in the light guide efficiency between the first light source 1a and the second light source 1b arranged in a row in the X direction by implementing the light guiding for the first light source 1a and the second light source 1b arranged in a row in the X direction to face the side face of the light guide member 3 by use of the reflection by the first curved surface 12a and the second curved surface 12b.

Second Embodiment

In the first embodiment, the description was given of the example in which two light sources (i.e., the first light source 1a and the second light source 1b) are arranged in a row in the X direction as the major axis direction, the two-step curved surface part 12 (i.e., the first curved surface 12a and the second curved surface 12b) is formed so that the two curved surfaces are in tandem in the X direction, and the light emitted from a plurality of light sources arranged in a row in the X direction and entering the inside of the light guide member 3 is guided in the X direction. Although it is also possible to arrange a plurality of light sources (e.g., LEDs) in a row in the Y direction as the minor axis direction, there is a limitation in the number of light sources that can be arranged. For example, when the width W of the incidence part 3a of the light guide member 3 is 2 mm, three light sources can be arranged in a row in the Y direction at the maximum and a total of six (=3×2) light sources can be arranged. In an image reading device for finance, there are cases where a plurality of light sources are required to emit IR light and UV light in addition to the emission of visible light of each of the red (R), green (G) and blue (B) colors. Especially, in order to increase the light amount of the UV light, four LEDs are necessary. Therefore, a structure in which up to a maximum of eight LEDs can be arranged is being requested.

Figure 15:
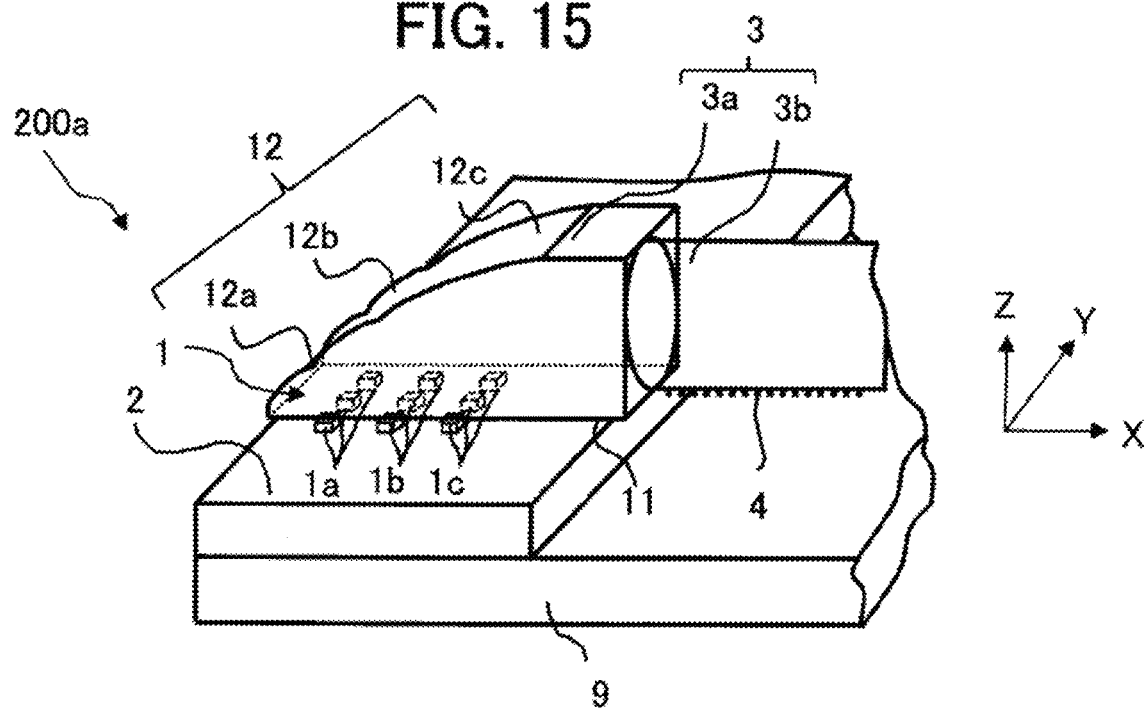
FIG. 15 is an enlarged perspective view showing an incidence part of a light guide member and a plurality of light sources in an illumination device according to a second embodiment.

FIG. 15 is an enlarged perspective view showing the incidence part 3a of the light guide member 3 and the light source unit 1 in an illumination device 200a according to a second embodiment. The curved surface part 12 is formed of three steps of curved surfaces, namely, a first curved surface 12a, a second curved surface 12b and a third curved surface 12c. In the light source unit 1, three LEDs, namely, three light sources, are arranged in a row in the X direction as the major axis direction of the light guide member 3, and three LEDs, namely, three light sources, are arranged in a row in the Y direction as the minor axis direction of the light guide member 3. Thus, a total of nine (=3×3) LEDs are arranged in the example of FIG. 15.

Figure 16:
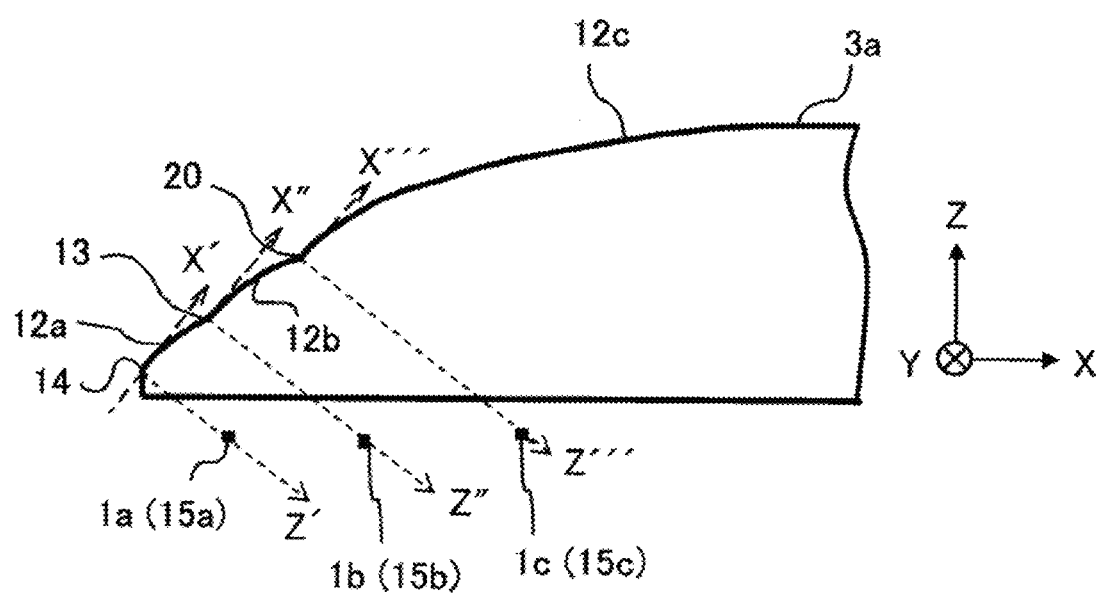
FIG. 16 is a cross-sectional view showing the incidence part of the light guide member of the illumination device according to the second embodiment.

FIG. 16 is a cross-sectional view showing the incidence part 3a of the light guide member 3 of the illumination device 200a according to the second embodiment. FIG. 16 shows a cross section of the incidence part 3a at a plane parallel to the XZ plane. The curved surface part 12 includes two discontinuities, namely, a discontinuity point 13 and a discontinuity point 20. The curved surface part 12 is formed of the first curved surface 12a, the second curved surface 12b and the third curved surface 12c. The discontinuity point 13 represents a boundary line between the first curved surface 12a and the second curved surface 12b. The discontinuity point 20 represents a boundary line between the second curved surface 12b and the third curved surface 12c.

Each of the first curved surface 12a, the second curved surface 12b and the third curved surface 12c is desired to be a paraboloid. Among a plurality of light sources included in the light source unit 1, three light sources arranged in a row in the X direction are a first light source 1a, a second light source 1b and a third light source 1c from the end part's side of the light guide member 3. The first light source 1a, the second light source 1b and the third light source 1c are desired to be respectively arranged in the vicinity of a focal point 15a, a focal point 15b and a focal point 15c.

Figure 17A:
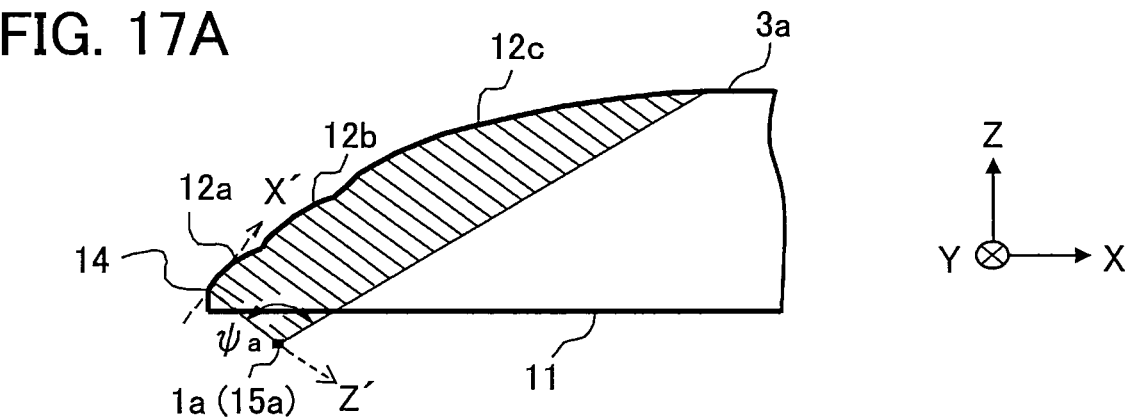
FIGS. 17A to 17C are cross-sectional views showing ranges of the light guide emission angle in the incidence part of the light guide member of the illumination device according to the second embodiment.
Figure 17B:
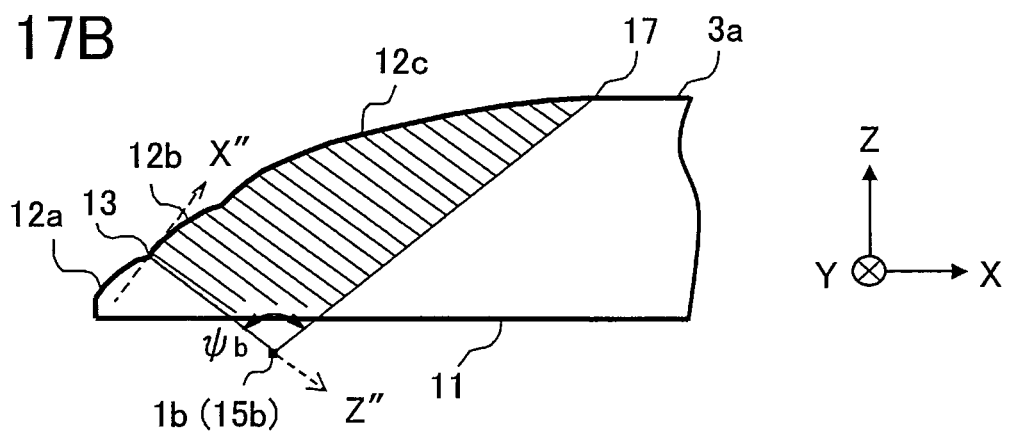
Figure 17C:
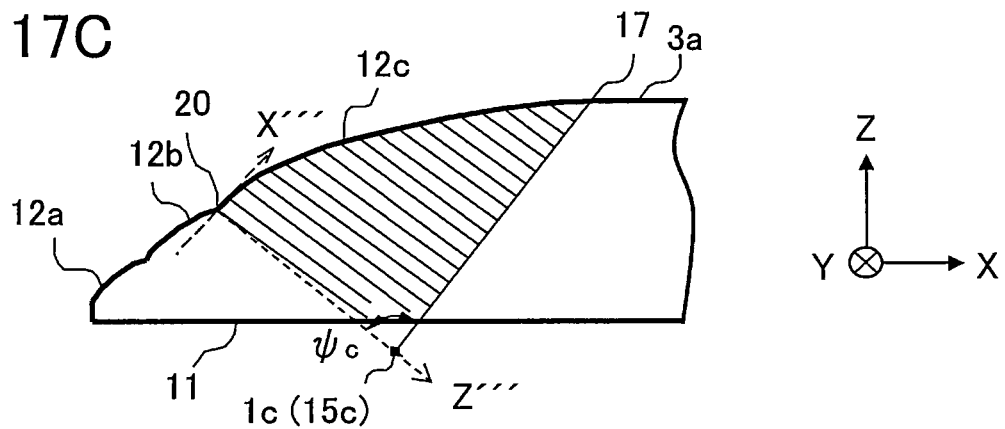

FIGS. 17A to 17C are cross-sectional views showing ranges of the light guide emission angle in the incidence part 3a of the light guide member 3 of the illumination device 200a according to the second embodiment. When the inclination angles $\theta_a$, $\theta_b$ and $\theta_c$ of the parabola axes of the first curved surface 12a, the second curved surface 12b and the third curved surface 12c are set to satisfy $\theta_a=\theta_b=\theta_c=\theta_0$ and the first light source 1a, the second light source 1b and the third light source 1c are respectively arranged at the focal point 15a, the focal point 15b and the focal point 15c, light emitted within the angle ranges shown in FIGS. 17A to 17C is guided inside the light guide member 3. Since the light emitted from the first light source 1a may be reflected by any one of the curved surfaces, light emitted within an angle $\psi_a$ range in FIG. 17A is guided. Since the light emitted from the second light source 1b is guided if it is reflected by the second curved surface 12b or the third curved surface 12c, light emitted within an angle $\psi_b$ range in FIG. 17B is guided. Since the light emitted from the third light source 1c is guided if it is reflected by the third curved surface 12c, light emitted within an angle $\psi_c$ range in FIG. 17C is guided. Accordingly, in the second embodiment, the variation in the light guide efficiency of the light emitted from the first light source 1a, the second light source 1b and the third light source 1c can be reduced compared to the case where the curved surface part 12 is formed of one curved surface.

As described above, with the illumination device 200a according to the second embodiment, it becomes possible to reduce the variation in the light guide efficiency among the LEDs arranged in a row in the X direction by implementing the light guiding for the three light sources arranged in a row in the X direction to face the side face of the light guide member 3 by use of the reflection by the three curved surfaces.

Except for the above-described features, the second embodiment is the same as the first embodiment.

Third Embodiment

In the first embodiment, the description was given of the example in which the LED substrate 2 on which a plurality of light sources are mounted and the sensor substrate 9 on which the photoreceptor element unit 8 is mounted are separate components. If the LED substrate 2 and the sensor substrate 9 can be integrated together, the cost is reduced and the assembly is facilitated. However, the position of the light guide member 3 in the Z direction is restricted depending on the positional relationship between the image capturing optical system 7 and the illumination target body 10. In the case where the LED substrate 2 and the sensor substrate 9 are integrated together, the spacing between the incidence surface 11 and the light emission surfaces of the plurality of light sources widens and the light utilization efficiency decreases. Therefore, in a third embodiment, the light guide member 3 is formed so that the incidence surface 11 of the incidence part 3a of the light guide member 3 projects in the −Z direction relative to the position of an end part of the central part 3b in the −Z direction.

Figure 18:
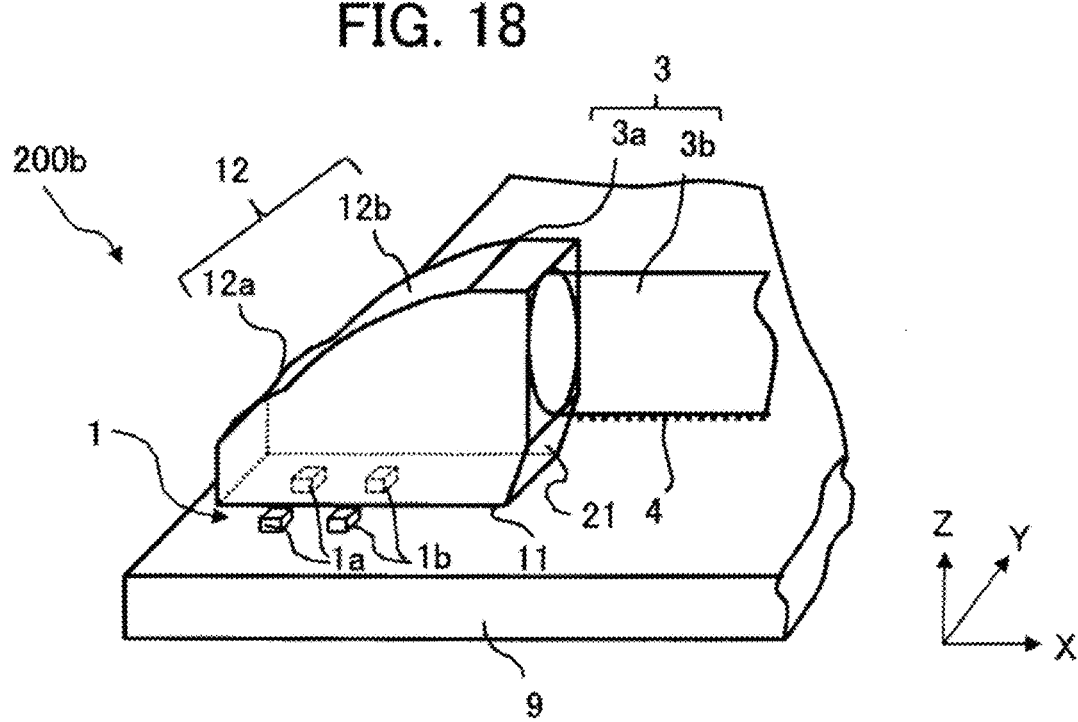
FIG. 18 is an enlarged perspective view showing an incidence part of a light guide member and a plurality of light sources in an illumination device according to a third embodiment.

FIG. 18 is an enlarged perspective view showing the incidence part 3a of the light guide member 3 and a plurality of light sources in an illumination device 200b according to the third embodiment. In the third embodiment, so as to minimize the spacing between the incidence surface 11 and the light emission surfaces of the plurality of light sources, e.g., to 0.3 mm, the incidence part 3a has a shape in which the incidence surface 11 is shifted in the −Z direction. By employing such a shape, in the light emitted from the plurality of light sources, light not incident upon the incidence surface 11 can be reduced.

Figure 19:
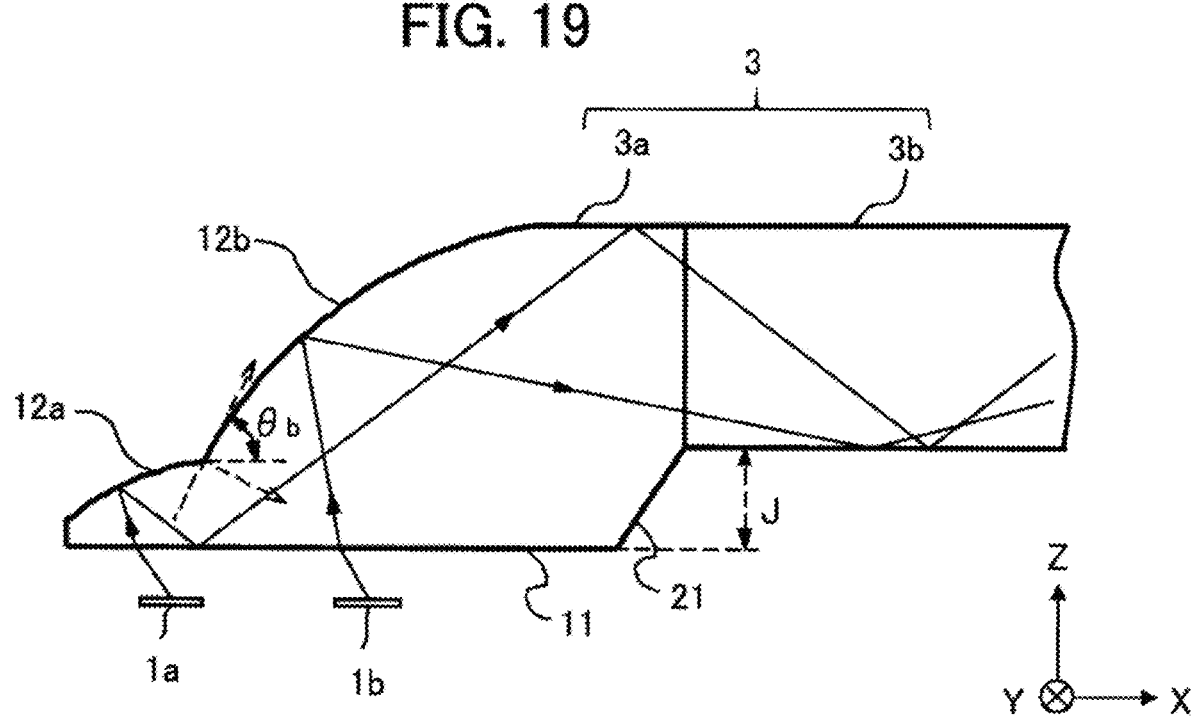
FIG. 19 is a cross-sectional view showing the incidence part of the light guide member of the illumination device according to the third embodiment.

FIG. 19 is a cross-sectional view showing the incidence part 3a of the light guide member 3 of the illumination device 200b according to the third embodiment. FIG. 19 shows a cross section of the incidence part 3a at a plane parallel to the XZ plane. The incidence surface 11 projects in the −Z direction by a length J relative to the end part of the central part 3b in the −Z direction. The length J is 1 mm, for example. The incidence surface 11 and a surface of the end part of the central part 3b in the −Z direction are connected to each other by a surface 21. The light emitted from the second light source 1b is reflected by the second curved surface 12b and can thereafter leak out through the surface 21 formed by shifting the incidence surface 11 in the −Z direction, and the light guide efficiency can decrease. To avoid the decrease in the light guide efficiency, it is desirable to increase the inclination $\theta_b$ of the second curved surface 12b and decrease the angle of the reflected light from the second curved surface 12b with respect to the X direction.

As described above, with the illumination device 200b according to the third embodiment, it becomes possible to reduce the variation in the light guide efficiency between the LEDs arranged in a row in the X direction by implementing the light guiding for the two light sources arranged in a row in the X direction to face the side face of the light guide member 3 by use of the reflection by the two curved surfaces.

Further, with the illumination device 200b according to the third embodiment, it becomes possible to reduce the variation in the light guide efficiency between the LEDs arranged in a row in the X direction by implementing the light guiding for the two LEDs arranged in a row in the X direction to face the side face of the light guide member 3 by use of the reflection by the two curved surfaces.

Furthermore, with the illumination device 200*b* according to the third embodiment, it becomes possible to increase the light incident upon the incidence surface 11 since the spacing between the incidence surface 11 of the light guide member 3 and the light emission surfaces of the first light source 1*a* and the second light source 1*b* can be narrowed. Consequently, the light utilization efficiency increases.

Except for the above-described features, the third embodiment is the same as the first embodiment.

DESCRIPTION OF REFERENCE CHARACTERS

1: light source unit, 1*a*: first light source, 1*b*: second light source, 1*c*: third light source, 2: LED substrate, 22: lead wire, 3: light guide member, 3*a*: incidence part, 3*b*: central part, 4: scattering surface, 5: holder, 6: permeable member, 7: image capturing optical system, 8: photoreceptor element unit, 9: sensor substrate, 10: illumination target body, 11: incidence surface, 12: curved surface part, 12*a*: first curved surface, 12*b*: second curved surface, 12*c*: third curved surface, 100: image scanner, 200, 200*a*, 200*b*: illumination device.

What is claimed is:

1. An illumination device comprising:
   a plurality of light sources; and
   a light guide member to propagate light entering inside while reflecting the light, wherein
   the light guide member includes:
      an incidence part that has an incidence surface to allow light emitted from the plurality of light sources to enter and to guide the entered light towards a center of the light guide member in a major axis direction thereof; and
      a central part that has a scattering surface to emit the light guided from the incidence part towards an illumination target body,
   the plurality of light sources include:
      a first light source that has a light emission surface facing the incidence surface; and
      a second light source that has a light emission surface facing the incidence surface and is arranged on the central part's side relative to the first light source,
   and in a same cross-sectional view, the incidence part has:
      a first curved surface that reflects the light entering through the incidence surface towards the central part; and
      a second curved surface that is arranged on the central part's side relative to the first curved surface and reflects the light entering through the incidence surface towards the central part,
   wherein the second light source is arranged on a central side of the light guide member relative to an end point of the second curved surface on an end part's side of the light guide member in a cross section at a plane orthogonal to the incidence surface and parallel to the major axis direction, and
   the first curved surface and the second curved surface are joined at a discontinuity point in the cross section, and the first curved surface and the second curved surface lack symmetry about the discontinuity point in the cross section.

2. The illumination device according to claim 1, wherein each of the first curved surface and the second curved surface has a paraboloidal shape.

3. The illumination device according to claim 2, wherein the paraboloidal shape of the first curved surface corresponds to a different parabola than a parabola corresponding to the paraboloidal shape of the second curved surface.

4. The illumination device according to claim 1, wherein the first light source and the second light source differ from each other in a wavelength of emitted light.

5. The illumination device according to claim 1, wherein
   the first curved surface is a surface that is convex in a normal direction of the light emission surface of the first light source and outward, and
   the second curved surface is a surface that is convex in a normal direction of the light emission surface of the second light source and outward.

6. The illumination device according to claim 1, wherein
   the plurality of light sources further include a third light source that has a light emission surface facing the incidence surface and is arranged on the central part's side relative to the second light source, and
   the incidence part further has a third curved surface that is arranged on the central part's side relative to the second curved surface and reflects the light emitted from the light emission surface of the third light source and entering through the incidence surface towards the central part.

7. The illumination device according to claim 6, wherein the third curved surface has a paraboloidal shape.

8. The illumination device according to claim 7, wherein the third curved surface is a surface that is convex in a normal direction of the light emission surface of the third light source and outward.

9. The illumination device according to claim 1, further comprising a substrate on which the plurality of light sources are mounted,
   wherein the light guide member is formed so that a distance from the substrate to the central part is longer than a distance from the substrate to the incidence surface.

10. The illumination device according to claim 1, wherein the scattering surface has a scattering pattern that changes depending on a distance from an end of the light guide member.

11. An image scanner comprising:
    the illumination device according to claim 1; and
    a photoreceptor to optically scan the illumination target body illuminated with light by the illumination device.

12. The illumination device according to claim 1, wherein each of the plurality of light sources are formed as bare chip light emitting diodes.

13. The illumination device according to claim 1, wherein the plurality of light sources include resin-molded light emitting diodes.

14. The illumination device according to claim 1, wherein the plurality of light sources include light emitting diodes and corresponding lenses.

15. The illumination device according to claim 1, wherein the first curved surface and the second curved surface have different focal points.

16. The illumination device according to claim 1 wherein the light guide member is acrylic.

17. The illumination device according to claim 1, wherein the first curved surface and the second curved surface respectively have a reflective coating disposed thereon to prevent light from escaping through the first curved surface and the second curved surface.

18. The illumination device according to claim 17, wherein the reflective coating includes aluminum.

19. An illumination device comprising:
a plurality of light sources; and
a light guide member formed of a transparent material and having a rodlike shape, the light guide member being configured to propagate light entering inside thereof while reflecting the light, wherein:
the light guide member includes:
  an incidence part that has an incidence surface to allow light emitted from the plurality of light sources to enter and to guide the entered light towards a center of the light guide member in a major axis direction thereof, and
  a central part that has a scattering surface to emit the light guided from the incidence part towards an illumination target body,
the plurality of light sources include:
  a first light source that has a light emission surface facing the incidence surface, and
  a second light source that has a light emission surface facing the incidence surface and is arranged on a side of the central part relative to the first light source, in a same cross-sectional view, the incidence part has:
  a first curved surface that is placed facing the incidence surface, is arranged on the side of the central part relative to the first curved surface and reflects the light entering through the incidence surface towards the central part,
the second light source is arranged on a central side of the light guide member relative to an end point of the second curved surface on a side of an end part of the light guide member in a cross section at a plane orthogonal to the incidence surface and parallel to the major axis direction, and
a first edge part of the first curved surface and a second edge part as the end part of the second curved surface are joined at a discontinuity point in the cross section, and the first and second edge parts project towards the incidence surface of the incidence part.

* * * * *